United States Patent
Xu et al.

(10) Patent No.: US 10,057,917 B2
(45) Date of Patent: Aug. 21, 2018

(54) UPLINK SCHEDULING METHOD AND CONTROL NODE

(71) Applicant: HUAWEI TECHNOLOGIES CO., LTD., Shenzhen (CN)

(72) Inventors: Min Xu, Shanghai (CN); Dong Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 203 days.

(21) Appl. No.: 14/662,842

(22) Filed: Mar. 19, 2015

(65) Prior Publication Data
US 2015/0195852 A1    Jul. 9, 2015

Related U.S. Application Data

(63) Continuation of application No. PCT/CN2012/081674, filed on Sep. 20, 2012.

(51) Int. Cl.
*H04W 36/30* (2009.01)
*H04W 72/12* (2009.01)
*H04W 72/04* (2009.01)

(52) U.S. Cl.
CPC ... *H04W 72/1268* (2013.01); *H04W 72/0406* (2013.01); *H04W 72/12* (2013.01)

(58) Field of Classification Search
CPC ......... H04W 72/1268; H04W 72/0406; H04W 72/12
See application file for complete search history.

(56) References Cited

U.S. PATENT DOCUMENTS

| | | | | |
|---|---|---|---|---|
| 7,437,178 B2 * | 10/2008 | Jeong | ................ | H04W 36/0055 370/331 |
| 2009/0196230 A1 * | 8/2009 | Kim | .................... | H04W 74/002 370/328 |

(Continued)

FOREIGN PATENT DOCUMENTS

| CN | 101132224 | 2/2008 |
|---|---|---|
| CN | 101174864 | 5/2008 |

(Continued)

OTHER PUBLICATIONS

Extended European Search Report dated Jul. 2, 2015 for corresponding European Patent Application No. 12885080.7.

(Continued)

*Primary Examiner* — Phuc Tran
(74) *Attorney, Agent, or Firm* — Staas & Halsey LLP

(57) ABSTRACT

Embodiments of the present invention disclose an uplink scheduling method and a control node and relate to the communications field and can complete uplink transmission through scheduling of a device of a first cell when a device of a second cell cannot receive uplink scheduling information of a UE. The method of the present invention includes: sending configuration information to the user equipment UE, so that the UE monitors a first control channel of a first cell according to the configuration information, where the configuration information includes channel configuration information of the first control channel of the first cell, the first control channel includes an E-DCH Absolute Grant Channel E-AGCH, and the first cell is a non-serving cell of the UE. The embodiments of the present invention are mainly applied to an enhanced scheduling process of an uplink channel.

17 Claims, 12 Drawing Sheets

(56) References Cited

U.S. PATENT DOCUMENTS

| | | | |
|---|---|---|---|
| 2010/0023833 A1 | 1/2010 | Pan et al. | |
| 2012/0213092 A1* | 8/2012 | Sun | H04W 52/244 370/248 |
| 2012/0230280 A1* | 9/2012 | Chandra | H04L 1/0025 370/329 |
| 2012/0250659 A1* | 10/2012 | Sambhwani | H04W 74/002 370/332 |
| 2013/0163564 A1* | 6/2013 | Pani | H04W 36/30 370/332 |
| 2014/0119318 A1* | 5/2014 | Zhu | H04W 72/1284 370/329 |
| 2017/0013517 A1 | 1/2017 | Pani et al. | |

FOREIGN PATENT DOCUMENTS

| | | |
|---|---|---|
| CN | 101364826 | 2/2009 |
| CN | 101765193 | 6/2010 |
| CN | 101835269 | 9/2010 |
| CN | 101933362 | 12/2010 |
| EP | 1 467 586 A2 | 10/2004 |
| EP | 1 467 586 A3 | 6/2006 |
| EP | 2 245 800 | 8/2009 |
| RU | 2 414 102 | 9/2010 |
| WO | WO 2008/024889 A2 | 2/2008 |
| WO | WO 2008/024889 A3 | 2/2008 |
| WO | WO 2009/100756 A1 | 8/2009 |
| WO | WO2012/112868 | 8/2012 |

OTHER PUBLICATIONS

"3$^{rd}$ Generation Partnership Project; Technical Specification Group Radio Access Network; Medium Access Control (MAC) protocol specification (Release 11) (3GPP TS 25.321 V11.1.0 (Jun. 2012))," 3GPP Organizational Partners (ARIB, ATIS, CCSA, ETSI, TTA, TTC), Jun. 2012, pp. 1-198.

International Search Report dated Jul. 11, 2013 in corresponding international application PCT/CN2012/081674.

*3rd Generation Partnership Project; Technical Specification Group Radio Access Network; Enhanced uplink; Overall description; Stage 2 (Release 11)* (*3GPP TS 25.319 V11.5.0* (Sep. 2012)), 3GPP Organizational Partners (ARIB, ATIS, CCSA, ETSI, TTA, TTC), Sep. 2012, pp. 1-85.

*3rd Generation Partnership Project; Technical Specification Group Radio Access Network; Radio Resource Control (RRC); Protocol specification (Release 11)* (*3GPP TS 25.331 V11.2.0* (Jun. 2012)), 3GPP Organizational Partners (ARIB, ATIS, CCSA, ETSI, TTA, TTC), Jun. 2012, pp. 1-1924.

International Search Report dated Jul. 11, 2013 for corresponding International Patent Application No. PCT/CN2012/081674.

Russian Office Action dated Apr. 13, 2016 in corresponding Russian Patent Application No. 2015114554.

Office Action, dated May 4, 2017, in Chinese Application No. 201280001416.4 (8 pp.).

Office Action, dated Oct. 24, 2017, in Chinese Application No. 201280001416.4 (9 pp.).

\* cited by examiner

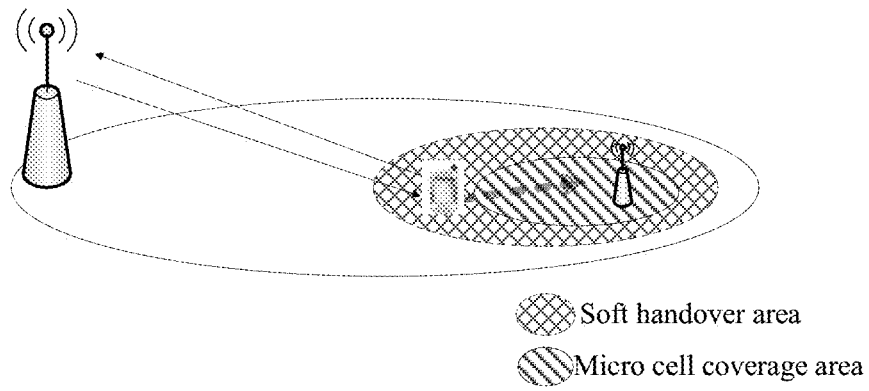

Soft handover area
Micro cell coverage area

FIG. 1

A control node sends configuration information to a user equipment UE, so that the UE monitors a first control channel of a first cell according to the configuration information, where the configuration information includes channel configuration information of the first control channel of the first cell /101

FIG. 2

A UE receives configuration information sent by a control node, where the configuration information includes channel configuration information of a first control channel of a first cell /201

The UE monitors the first control channel of the first cell according to the configuration information /202

FIG. 3

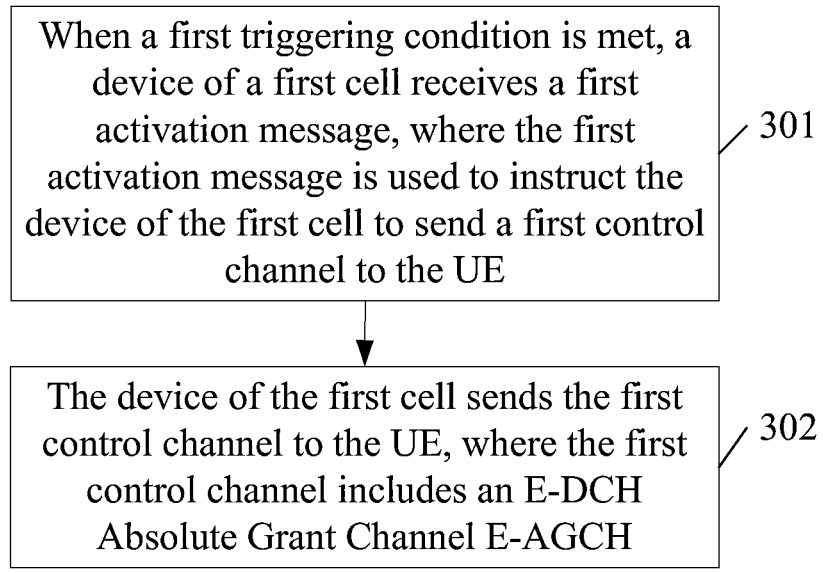

A UE receives an RG up instruction sent by a device of a first cell, where the first cell is a non-serving cell of the UE ⟋ 601

FIG. 7

A device of a first cell sends an RG up instruction to a UE after receiving a first activation message ⟋ 701

FIG. 8

A device of a second cell detects an SIR of a UE, and, when the SIR of the UE is lower than a certain threshold, sends through an HS-SCCH a command that instructs the UE to monitor an RG up instruction of a first cell to the UE ⟋ 801

FIG. 9

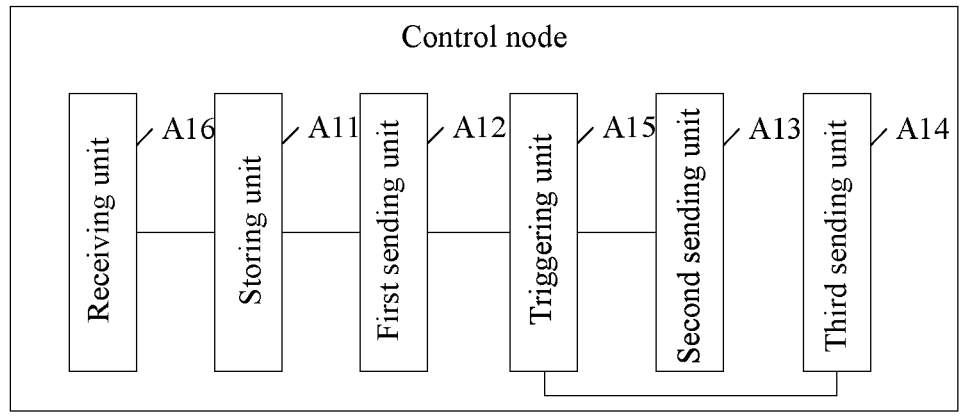
FIG. a1
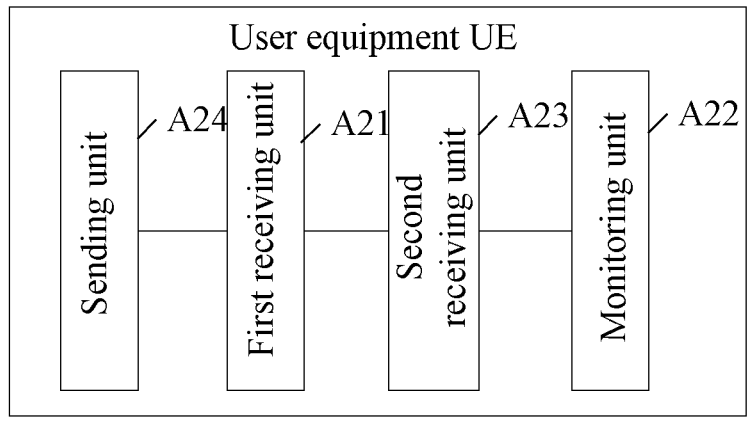
FIG. a2
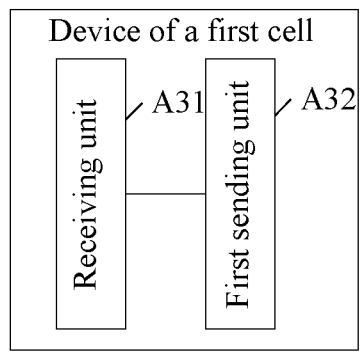
FIG. a3

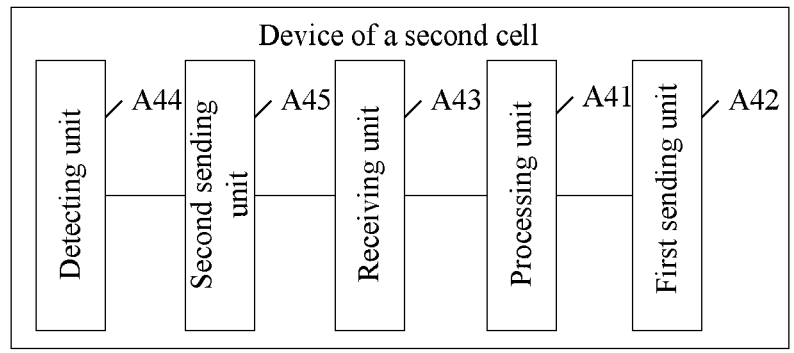
FIG. a4
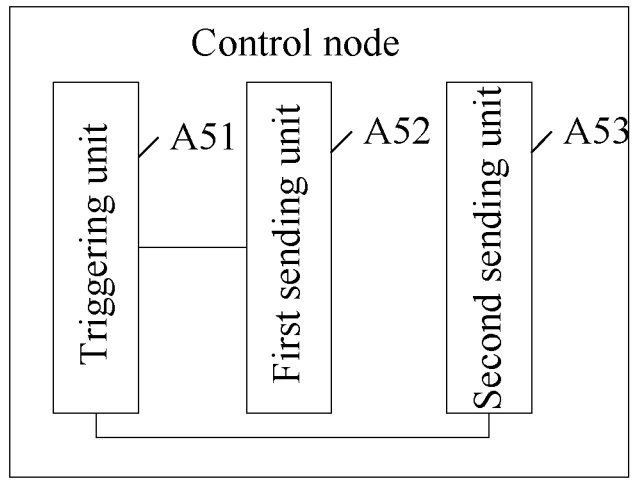
FIG. a5
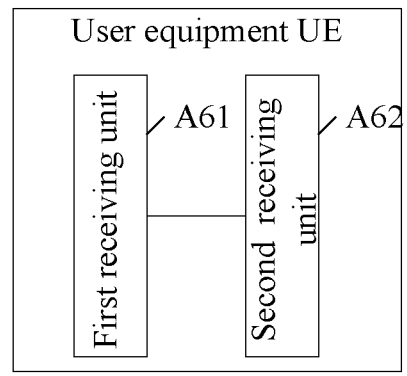
FIG. a6

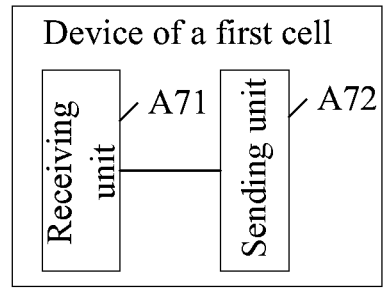
FIG. a7
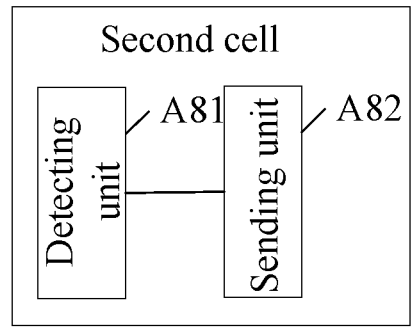
FIG. a8
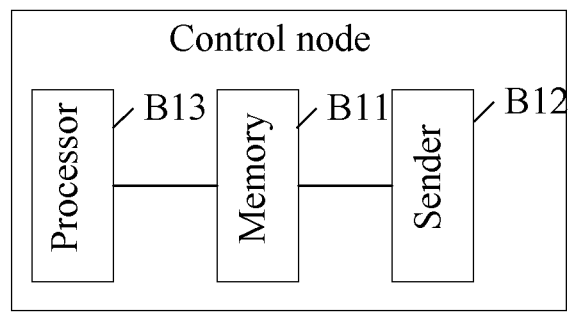
FIG. b1

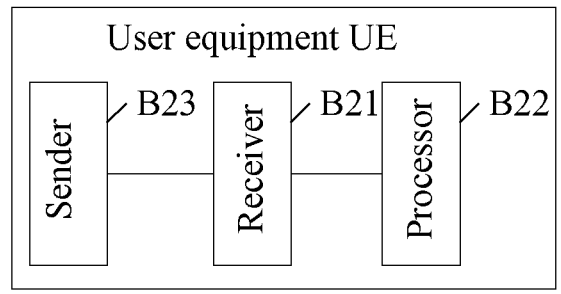
FIG. b2
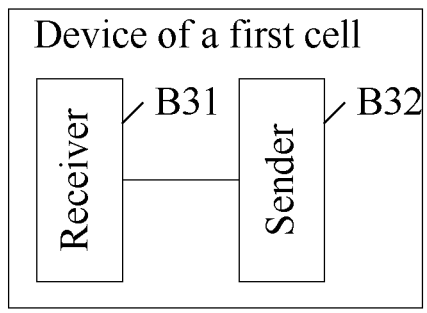
FIG. b3
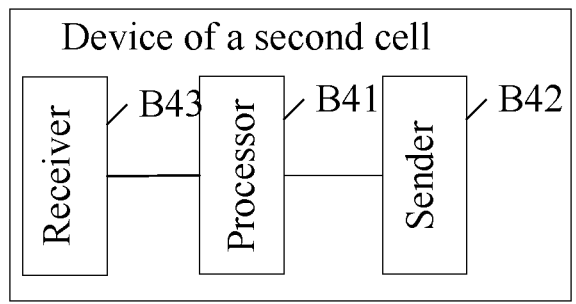
FIG. b4

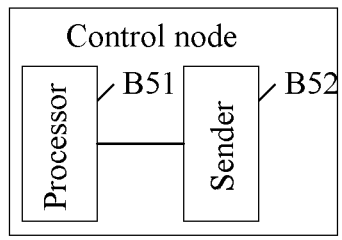
FIG. b5
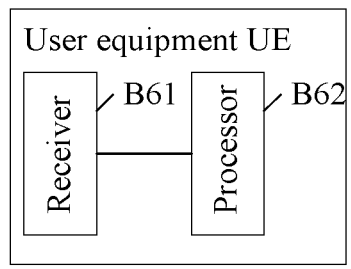
FIG. b6
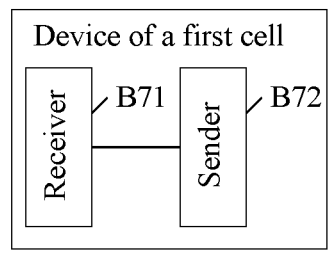
FIG. b7
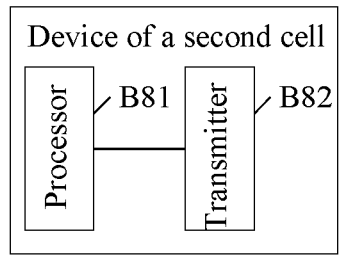
FIG. b8

UPLINK SCHEDULING METHOD AND CONTROL NODE

CROSS-REFERENCE TO RELATED APPLICATION

This application is a continuation of International Application No. PCT/CN2012/081674 filed on Sep. 20, 2012, which is hereby incorporated by reference in the entirety.

TECHNICAL FIELD

The present application relates to the communications field, and in particular, to an uplink scheduling method and a control node.

BACKGROUND

The wireless communications field is faced with pressure of an explosive increase in data services. To increase network capacity and reduce transmission cost, the industry has proposed a heterogeneous network (Heterogeneous Network, Hetnet) technology. A Hetnet is formed by multiple cells of different sizes and different types, including: macro cells (Macro Cell) and micro cells. The micro cells include: a micro cell (Micro Cell), a pico cell (Pico Cell), a femto cell (Femto Cell), a cell with remote radio heads (Remote Radio Head, RRH), and the like. When more micro cells are deployed in an area with heavy traffic, a network capacity of the area can be significantly improved. In addition, the scale of a micro cell is relatively small, and capital expenditure (Capital Expenditure, Capax) and operating expense (Operating Expense, Opex) of the cell are relatively low. Therefore, the Hetnet is valued by lots of operators, and it is an important direction of evolution of a wireless network.

A micro cell and a macro cell may be deployed in intra-frequency mode or deployed in inter-frequency mode. When the micro cell and the macro cell are deployed in intra-frequency mode, an intra-frequency interference problem may occur in an area with overlapping coverage between the macro cell and the micro cell. Specifically, as shown in FIG. 1, the outermost circle is a coverage area of the macro cell, the innermost circle is a coverage area of the micro cell, and the circular area between the dashed circle and the innermost circle is a soft handover area. In the soft handover area, a user equipment (User Equipment, UE) simultaneously establishes two connections for separately connecting to the macro cell and the micro cell.

In the prior art, a method for reducing a measuring and reporting threshold of the UE and expanding the soft handover area of the macro cell and the micro cell is used to avoid an intra-frequency interference problem of the macro cell and the micro cell. In the method, the UE that has accessed the macro cell has entered the soft handover area before generating uplink interference on the micro cell; and the UE adds the micro cell to an active set, that is, the UE establishes a connection with the micro cell. In this way, the UE is capable of considering path loss of a micro base station and does not continue increasing uplink transmit power, so as to avoid the uplink interference on the micro cell.

However, in a process of implementing the interference coordination, the inventor has found at least the following problems in the prior art: after the UE that has accessed a serving cell adds a non-serving cell to the active set in advance, because path loss of an uplink of the UE is relatively small in the non-serving cell, the UE gradually reduces the uplink transmit power, which causes that the serving cell cannot receive or correctly demodulate uplink scheduling information of the UE and further cannot perform uplink scheduling for the UE; in addition, the non-serving cell may receive uplink data of the UE, but the UE cannot receive downlink control signaling of the non-serving cell, and therefore the UE cannot correctly and properly transmit the uplink data.

SUMMARY

Embodiments of the present invention provide an uplink scheduling method and a control node. When a second cell cannot receive uplink scheduling information of a UE, a first cell can be scheduled, so that the UE is capable of correctly and properly transmitting uplink data.

A first aspect of the embodiments of the present invention provides an uplink scheduling method, including:

sending, by a control node, configuration information to a user equipment UE, so that the UE monitors a first control channel of a first cell according to the configuration information, where the configuration information includes channel configuration information of the first control channel of the first cell, the first control channel includes an E-DCH Absolute Grant Channel E-AGCH, and the first cell is a non-serving cell of the UE.

With reference to the first aspect, in a possible implementation manner, after the sending, by a control node, configuration information to a UE, the method further includes:

sending, by the control node, a first activation message to a device of the first cell when a first triggering condition is met, where the first activation message is used to instruct the device of the first cell to send the first control channel to the UE.

With reference to the first aspect and the foregoing possible implementation manner, in another possible implementation manner, after the sending, by a control node, configuration information to a UE, the method further includes:

sending, by the control node, a triggering instruction to a device of a second cell when a first triggering condition is met, so that the device of the second cell sends, to the UE through a High Speed Shared Control Channel HS-SCCH, a command that instructs the UE to monitor the first control channel of the first cell, where the second cell is a serving cell of the UE.

With reference to the first aspect and the foregoing possible implementation manners, in another possible implementation manner, that the first triggering condition is met includes the following:

the control node receives a message that a signal to interference ratio SIR of the UE is lower than a certain threshold, where the message is sent by the device of the second cell; and/or, the control node determines that a block error rate of uplink data of the second cell is higher than a certain threshold.

With reference to the first aspect and the foregoing possible implementation manners, in another possible implementation manner, the sending, by a control node, configuration information to a UE includes:

sending, by the control node, channel configuration information of the first cell to the UE, so that the UE simultaneously monitors an E-AGCH of the second cell and the first control channel of the first cell.

With reference to the first aspect and the foregoing possible implementation manners, in another possible implementation manner, the sending, by a control node, configuration information to a UE further includes:

sending, by the control node, a first Radio Resource Control Protocol RRC message to the UE, where the first RRC message is used to instruct the UE to monitor the first control channel of the first cell.

With reference to the first aspect and the foregoing possible implementation manners, in another possible implementation manner, before the sending, by a control node, configuration information to a UE, the method further includes:

receiving, by the control node, capability information reported by the UE, where the capability information is used to determine a capability of the UE to support monitoring of the first control channel of the first cell.

A second aspect of the embodiments of the present invention further provides an uplink scheduling method, including:

receiving, by a user equipment UE, configuration information sent by a control node, where the configuration information includes channel configuration information of a first control channel of a first cell; and monitoring, by the UE, the first control channel of the first cell according to the configuration information, where the first control channel includes an E-DCH Absolute Grant Channel E-AGCH and the first cell is a non-serving cell of the UE.

With reference to the second aspect, in a possible implementation manner, after the receiving, by a UE, configuration information sent by a control node, the method further includes:

receiving, by the UE through a High Speed Shared Control Channel HS-SCCH, a command that instructs the UE to monitor the first control channel of the first cell according to the configuration information; or receiving, by the UE, a first Radio Resource Control Protocol RRC message sent by the control node, where the first RRC message is used to instruct the UE to monitor the first control channel of the first cell.

With reference to the second aspect and the foregoing possible implementation manner, in another possible implementation manner, the monitoring, by the UE, the first control channel of the first cell according to the configuration information includes:

receiving, by the UE, an RG up instruction sent by a device of the first cell.

With reference to the second aspect and the foregoing possible implementation manners, in another possible implementation manner, the monitoring, by the UE, the first control channel of the first cell according to the configuration information further includes:

switching, by the UE, an uplink serving cell to the first cell.

With reference to the second aspect and the foregoing possible implementation manners, in another possible implementation manner, the monitoring, by the UE, the first control channel of the first cell according to the configuration information further includes:

simultaneously monitoring, by the UE, an E-AGCH of a second cell and the first control channel of the first cell, where the second cell is a serving cell of the UE.

With reference to the second aspect and the foregoing possible implementation manners, in another possible implementation manner, before the receiving, by a UE, configuration information sent by a control node, the method further includes:

reporting, by the UE, capability information of supporting monitoring of the first control channel of the first cell to the control node.

A third aspect of the embodiments of the present invention further provides an uplink scheduling method, including:

receiving, by a device of a first cell, a first activation message when a first triggering condition is met, where the first activation message is used to instruct the device of the first cell to send a first control channel to a user equipment UE; and sending, by the device of the first cell, the first control channel to the UE, where the first control channel includes an E-DCH Absolute Grant Channel E-AGCH.

With reference to the third aspect, in a possible implementation manner, that the first triggering condition is met includes the following:

a control node receives a message that a signal to interference ratio SIR of the UE is lower than a certain threshold, where the message is sent by a device of a second cell; and/or, the control node determines that a block error rate of uplink data of the second cell is higher than a certain threshold.

With reference to the third aspect and the foregoing possible implementation manner, in another possible implementation manner, after the receiving, by a device of the first cell, a first activation message, the method further includes:

sending, by the device of the first cell, an RG up instruction to the UE.

A fourth aspect of the embodiments of the present invention further provides an uplink scheduling method, including:

sending, by a device of a second cell to a user equipment UE through a High Speed Shared Control Channel HS-SCCH, a command that instructs the UE to monitor a first control channel of a first cell, where:

the first control channel includes an E-DCH Absolute Grant Channel E-AGCH, and the first cell is a non-serving cell of the UE.

With reference to the fourth aspect, in a possible implementation manner, before the sending, by a device of a second cell to a UE through a High Speed Shared Control Channel HS-SCCH, a command that instructs the UE to monitor a first control channel of a first cell, the method further includes:

receiving, by the device of the second cell, a triggering instruction sent by a control node; and after receiving the triggering instruction, sending, by the device of the second cell, to a UE through a High Speed Shared Control Channel HS-SCCH, a command that instructs the UE to monitor a first control channel of a first cell.

With reference to the fourth aspect and the foregoing possible implementation manner, in another possible implementation manner, before the receiving, by the device of the second cell, a triggering instruction sent by a control node, the method further includes:

detecting, by the device of the second cell, a signal to interference ratio SIR of the UE; and when the signal to interference ratio SIR of the UE is lower than a certain threshold, sending, by the device of the second cell, a message that the signal to interference ratio SIR of the UE is lower than the certain threshold to the control node, so that the control node sends the triggering instruction.

A fifth aspect of the embodiments of the present invention further provides an uplink scheduling method, including:

sending, by a control node, a first activation message to a device of a first cell when a first triggering condition is met, so that the device of the first cell sends an RG up instruction to a user equipment UE, where:

the first cell is a non-serving cell of the UE.

With reference to the fifth aspect, in a possible implementation manner, the method further includes:

sending, by the control node, a triggering instruction to a device of a second cell, so that the device of the second cell sends, to the UE through a High Speed Shared Control Channel HS-SCCH, a command that instructs the UE to monitor the RG up instruction of the first cell, where the second cell is a serving cell of the UE; or sending, by the control node, a first Radio Resource Control Protocol RRC message to the UE, where the first RRC message is used to instruct the UE to monitor the RG up instruction of the first cell.

With reference to the fifth aspect and the foregoing possible implementation manner, in another possible implementation manner, that the first triggering condition is met includes the following:

the control node receives a message that a signal to interference ratio SIR of the UE is lower than a certain threshold, where the message is sent by the device of the second cell; and/or, the control node determines that a block error rate of uplink data of the second cell is higher than a certain threshold.

A sixth aspect of the embodiments of the present invention further provides an uplink scheduling method, including:

receiving, by a user equipment UE, a High Speed Shared Control Channel HS-SCCH command sent by a device of a second cell, where the HS-SCCH command is used to instruct the UE to monitor an RG up instruction of a first cell; or receiving, by a UE, a first Radio Resource Control Protocol RRC message sent by a control node, where the first RRC message includes an RG up instruction that instructs the UE to monitor a first cell; and receiving, by the UE, the RG up instruction sent by a device of the first cell, where the first cell is a non-serving cell of the UE.

A seventh aspect of the embodiments of the present invention further provides an uplink scheduling method, including:

sending, by a device of a first cell, an RG up instruction to a user equipment UE after receiving a first activation message, where:

the first cell is a non-serving cell of the UE.

An eighth aspect of the embodiments of the present invention further provides an uplink scheduling method, including:

detecting, by a device of a second cell, a signal to interference ratio SIR of a user equipment UE, and when the SIR of the UE is lower than a certain threshold, sending, to the UE through a High Speed Shared Control Channel HS-SCCH, a command that instructs the UE to monitor an RG up instruction of a first cell; or sending, by the device of the second cell to the UE through an HS-SCCH after receiving a triggering instruction sent by a control node, a command that instructs the UE to monitor an RG up instruction of a first cell.

A ninth aspect of the embodiments of the present invention further provides a control node, including:

a storing unit, configured to store configuration information; and a first sending unit, configured to send the configuration information to a user equipment UE, so that the UE monitors a first control channel of a first cell according to the configuration information, where the configuration information includes channel configuration information of the first control channel of the first cell, the first control channel includes an E-DCH Absolute Grant Channel E-AGCH, and the first cell is a non-serving cell of the UE.

With reference to the ninth aspect, in a possible implementation manner, the control node further includes:

a second sending unit, configured to send a first activation message to a device of the first cell after the first sending unit sends the configuration information to the user equipment UE and when a first triggering condition is met, where the first activation message is used to instruct the device of the first cell to send the first control channel to the UE.

With reference to the ninth aspect and the foregoing possible implementation manner, in another possible implementation manner, the control node further includes:

a third sending unit, configured to send a triggering instruction to a device of a second cell after the first sending unit sends the configuration information to the user equipment UE and when the first triggering condition is met, so that the device of the second cell sends, to the UE through a High Speed Shared Control Channel HS-SCCH, a command that instructs the UE to monitor the first control channel of the first cell, where the second cell is a serving cell of the UE.

With reference to the ninth aspect and the foregoing possible implementation manners, in another possible implementation manner, the control node further includes:

a triggering unit, configured to detect whether the first triggering condition is met, where:

that the first triggering condition is met includes the following: the control node receives a message that a signal to interference ratio SIR of the UE is lower than a certain threshold, where the message is sent by the device of the second cell; and/or, the control node determines that a block error rate of uplink data of the second cell is higher than a certain threshold.

With reference to the ninth aspect and the foregoing possible implementation manners, in another possible implementation manner, the first sending unit includes:

a first sending module, configured to send the channel configuration information of the first cell to the UE, so that the UE simultaneously monitors an E-AGCH of the second cell and the first control channel of the first cell.

With reference to the ninth aspect and the foregoing possible implementation manners, in another possible implementation manner, the first sending unit further includes:

a second sending module, configured to send a first Radio Resource Control Protocol RRC message to the UE, where the first RRC message is used to instruct the UE to monitor the first control channel of the first cell.

With reference to the ninth aspect and the foregoing possible implementation manners, in another possible implementation manner, the control node further includes:

a receiving unit, configured to: before the first sending unit sends the configuration information to the UE, receive capability information reported by the UE, where the capability information is used to determine a capability of the UE to support monitoring of the first control channel of the first cell.

A tenth aspect of the embodiments of the present invention further provides a user equipment UE, including:

a first receiving unit, configured to receive configuration information sent by a control node, where the configuration information includes channel configuration information of a first control channel of a first cell; and a monitoring unit, configured to monitor the first control channel of the first cell according to the configuration information, where:

the first control channel includes an E-DCH Absolute Grant Channel E-AGCH, and the first cell is a non-serving cell of the UE.

With reference to the tenth aspect, in a possible implementation manner, the UE further includes:

a second receiving unit, configured to: after the first receiving unit receives the configuration information sent by the control node, receive, through a High Speed Shared Control Channel HS-SCCH, a command that instructs the UE to monitor the first control channel of the first cell according to the configuration information; or receive a first Radio Resource Control Protocol RRC message sent by the control node, where the first RRC message is used to instruct the UE to monitor the first control channel of the first cell.

With reference to the tenth aspect and the foregoing possible implementation manner, in another possible implementation manner, the monitoring unit includes:

a receiving module, configured to receive an RG up instruction sent by a device of the first cell.

With reference to the tenth aspect and the foregoing possible implementation manners, in another possible implementation manner, the monitoring unit further includes:

a switching module, configured to switch an uplink serving cell to the first cell.

With reference to the tenth aspect and the foregoing possible implementation manners, in another possible implementation manner, the monitoring unit further includes:

a monitoring module, configured to simultaneously monitor an E-AGCH of a second cell and the first control channel of the first cell, where the second cell is a serving cell of the UE.

With reference to the tenth aspect and the foregoing possible implementation manners, in another possible implementation manner, the UE further includes:

a sending unit, configured to: before the first receiving unit receives the configuration information sent by the control node, report capability information of supporting monitoring of the first control channel of the first cell to the control node.

An eleventh aspect of the embodiments of the present invention further provides a device of a first cell, including:

a receiving unit, configured to receive a first activation message when a first triggering condition is met, where the first activation message is used to instruct the device of the first cell to send a first control channel to a user equipment UE; and a first sending unit, configured to send the first control channel to the UE, where the first control channel includes an E-DCH Absolute Grant Channel E-AGCH.

With reference to the eleventh aspect, in a possible implementation manner, that the first triggering condition is met includes the following:

a control node receives a message that a signal to interference ratio SIR of the UE is lower than a certain threshold, where the message is sent by a device of a second cell; and/or, the control node determines that a block error rate of uplink data of the second cell is higher than a certain threshold.

With reference to the eleventh aspect and the foregoing possible implementation manner, in another possible implementation manner, the device of the first cell further includes:

a second sending unit, configured to send an RG up instruction to the UE after the receiving unit receives the first activation message.

A twelfth aspect of the embodiments of the present invention further provides a device of a second cell, including:

a processing unit, configured to generate a command that instructs a UE to monitor a first control channel of a first cell; and a first sending unit, configured to send, to the user equipment UE through a High Speed Shared Control Channel HS-SCCH, the command that is generated by the processing unit and instructs the UE to monitor the first control channel of the first cell, where:

the first control channel includes an E-DCH Absolute Grant Channel E-AGCH, and the first cell is a non-serving cell of the UE.

With reference to the twelfth aspect, in a possible implementation manner, the device of the second cell further includes:

a receiving unit, configured to: before the first sending unit sends, to the UE through the High Speed Shared Control Channel HS-SCCH, the command that instructs the UE to monitor the first control channel of the first cell, receive a triggering instruction sent by a control node; and a monitoring unit, configured to: after the receiving unit receives the triggering instruction, sends, to the UE through the High Speed Shared Control Channel HS-SCCH, the command that instructs the UE to monitor the first control channel of the first cell.

With reference to the twelfth aspect and the foregoing possible implementation manner, in another possible implementation manner, the device of the second cell further includes:

a detecting unit, configured to detect a signal to interference ratio SIR of the UE before the receiving unit receives the triggering instruction sent by the control node; and a second sending unit, configured to: when the signal to interference ratio SIR of the UE is lower than a certain threshold, send a message that the signal to interference ratio SIR of the UE is lower than the certain threshold to the control node, so that the control node sends the triggering instruction.

A thirteenth aspect of the embodiments of the present invention further provides a control node, including:

a triggering unit, configured to detect whether a first triggering condition is met; and a first sending unit, configured to send a first activation message to a device of a first cell when the triggering unit detects that the first triggering condition is met, so that the device of the first cell sends an RG up instruction to a UE, where:

the first cell is a non-serving cell of the UE.

With reference to the thirteenth aspect, in a possible implementation manner, the control node further includes:

a second sending unit, configured to send a triggering instruction to a device of a second cell, so that the device of the second cell sends, to the UE through a High Speed Shared Control Channel HS-SCCH, a command that instructs the UE to monitor the RG up instruction of the first cell, where the second cell is a serving cell of the UE; or send a first Radio Resource Control Protocol RRC message to the UE, where the first RRC message is used to instruct the UE to monitor the RG up instruction of the first cell.

With reference to the thirteenth aspect and the foregoing possible implementation manner, in another possible implementation manner, that the first triggering condition is met includes the following:

the control node receives a message that a signal to interference ratio SIR of the UE is lower than a certain threshold, where the message is sent by the device of the second cell; and/or, the control node determines that a block error rate of uplink data of the second cell is higher than a certain threshold.

A fourteenth aspect of the embodiments of the present invention further provides a user equipment UE, including:

a first receiving unit, receiving a High Speed Shared Control Channel HS-SCCH command sent by a device of a second cell, where the HS-SCCH command is used to instruct the UE to monitor an RG up instruction of a first cell; or receiving a first Radio Resource Control Protocol RRC message sent by a control node, where the first RRC message includes an RG up instruction that instructs the UE to monitor a first cell; and a second receiving unit, configured to: after the first receiving unit receives an instruction, receive the RG up instruction sent by a device of the first cell, where the first cell is a non-serving cell of the UE.

A fifteenth aspect of the embodiments of the present invention further provides a first cell, including:

a receiving unit, configured to receive a first activation message; and a sending unit, configured to send an RG up instruction to a user equipment UE after the receiving unit receives the first activation message, where the first cell is a non-serving cell of the UE.

A sixteenth aspect of the embodiments of the present invention further provides a second cell, including:

a detecting unit, configured to detect a signal to interference ratio SIR of a user equipment UE; and a sending unit, configured to: when the signal to interference ratio SIR of the UE is lower than a certain threshold, send, to the UE through a High Speed Shared Control Channel HS-SCCH, a command that instructs the UE to monitor an RG up instruction of a first cell; or after receiving a triggering instruction sent by a control node, send, to the UE through an HS-SCCH, a command that instructs the UE to monitor an RG up instruction of a first cell.

A seventeenth aspect of the embodiments of the present invention further provides a control node, including:

a memory, configured to store configuration information; and a transmitter, configured to send the configuration information to a user equipment UE, so that the UE monitors a first control channel of a first cell according to the configuration information, where the configuration information includes channel configuration information of the first control channel of the first cell, the first control channel includes an E-DCH Absolute Grant Channel E-AGCH, and the first cell is a non-serving cell of the UE.

With reference to the seventeenth aspect, in a possible implementation manner, the transmitter is further configured to send a first activation message to the first cell when a first triggering condition is met, where the first activation message is used to instruct the first cell to send the first control channel to the UE.

With reference to the seventeenth aspect and the foregoing implementation manner, in another possible implementation manner, the transmitter is further configured to send a triggering instruction to a device of a second cell after sending the configuration information to the UE and when a first triggering condition is met, so that the device of the second cell sends, to the UE through a High Speed Shared Control Channel HS-SCCH, a command that instructs the UE to monitor the first control channel of the first cell, where the second cell is a serving cell of the UE.

With reference to the seventeenth aspect and the foregoing possible implementation manners, in another possible implementation manner, the control node further includes:

a processor, configured to detect whether the first triggering condition is met, where:

that the first triggering condition is met includes the following: the control node receives a message that a signal to interference ratio SIR of the UE is lower than a certain threshold, where the message is sent by the device of the second cell; and/or, the control node determines that a block error rate of uplink data of the second cell is higher than a certain threshold.

With reference to the seventeenth aspect and the foregoing possible implementation manners, in another possible implementation manner, the transmitter is further configured to send the channel configuration information of the first cell to the UE, so that the UE simultaneously monitors an E-AGCH of the second cell and the first control channel of the first cell.

With reference to the seventeenth aspect and the foregoing possible implementation manners, in another possible implementation manner, the transmitter is further configured to send a first Radio Resource Control Protocol RRC message to the UE, where the first RRC message is used to instruct the UE to monitor the first control channel of the first cell.

With reference to the seventeenth aspect and the foregoing possible implementation manners, in another possible implementation manner, the control node further includes:

a receiver, configured to: before the transmitter sends the configuration information to the UE, receive capability information reported by the UE, where the capability information is used to determine a capability of the UE to support monitoring of the first control channel of the first cell.

An eighteenth aspect of the embodiments of the present invention further provides a user equipment UE, including:

a receiver, configured to receive configuration information sent by a control node, where the configuration information includes channel configuration information of a first control channel of a first cell; and a processor, configured to monitor the first control channel of the first cell according to the configuration information, where:

the first control channel includes an E-DCH Absolute Grant Channel E-AGCH, and the first cell is a non-serving cell of the UE.

With reference to the eighteenth aspect, in a possible implementation manner, the receiver is further configured to receive an instruction through a High Speed Shared Control Channel HS-SCCH, and the processor is further configured to monitor a command of the first control channel of the first cell according to the instruction received by the receiver and the configuration information; or the receiver is further configured to receive a first Radio Resource Control Protocol RRC message sent by the control node, and the processor is further configured to monitor the first control channel of the first cell according to an instruction of the first RRC message.

With reference to the eighteenth aspect and the foregoing possible implementation manner, in another possible implementation manner, the receiver is further configured to receive an RG up instruction sent by a device of the first cell.

With reference to the eighteenth aspect and the foregoing possible implementation manners, in another possible implementation manner, the processor is further configured to switch an uplink serving cell to the first cell.

With reference to the eighteenth aspect and the foregoing possible implementation manners, in another possible implementation manner, the processor is further configured to simultaneously monitor an E-AGCH of a second cell and the first control channel of the first cell, where the second cell is a serving cell of the UE.

With reference to the eighteenth aspect and the foregoing possible implementation manners, in another possible implementation manner, the UE further includes:

a transmitter, configured to: before the receiver receives the configuration information sent by the control node, report capability information of supporting monitoring of the first control channel of the first cell to the control node.

A nineteenth aspect of the embodiments of the present invention further provides a device of a first cell, including:

a receiver, configured to receive a first activation message when a first triggering condition is met, where the first activation message is used to instruct the device of the first cell to send a first control channel to a user equipment UE; and a transmitter, configured to send the first control channel to the UE, where the first control channel includes an E-DCH Absolute Grant Channel E-AGCH.

With reference to the nineteenth aspect, in a possible implementation manner, that the first triggering condition is met includes the following:

a control node receives a message that a signal to interference ratio SIR of the UE is lower than a certain threshold, where the message is sent by a device of a second cell; and/or, the control node determines that a block error rate of uplink data of the second cell is higher than a certain threshold.

With reference to the nineteenth aspect and the foregoing possible implementation manner, in another possible implementation manner, the transmitter is further configured to send an RG up instruction to the UE after the receiver receives the first activation message.

A twentieth aspect of the embodiments of the present invention further provides a device of a second cell, including:

a processor, configured to generate a command that instructs a UE to monitor a first control channel of a first cell; and a transmitter, configured to send, to the user equipment UE through a High Speed Shared Control Channel HS-SCCH, the command that instructs the UE to monitor the first control channel of the first cell, where:

the first control channel includes an E-DCH Absolute Grant Channel E-AGCH, and the first cell is a non-serving cell of the UE.

With reference to the twentieth aspect, in a possible implementation manner, the device of the second cell further includes:

a receiver, configured to: before the transmitter sends, to the UE through the High Speed Shared Control Channel HS-SCCH, the command that instructs the UE to monitor the first control channel of the first cell, receive a triggering instruction sent by a control node transmitter, where:

the transmitter is further configured to: after the receiver receives the triggering instruction, sends, to the UE through the High Speed Shared Control Channel HS-SCCH, the command that instructs the UE to monitor the first control channel of the first cell.

With reference to the twentieth aspect and the foregoing possible implementation manner, in another possible implementation manner, the processor is further configured to detect a signal to interference ratio SIR of the UE before the receiver receives the triggering instruction sent by the control node; and the transmitter is further configured to: when the signal to interference ratio SIR of the UE is lower than a certain threshold, send a message that the signal to interference ratio SIR of the UE is lower than the certain threshold to the control node, so that the control node sends the triggering instruction.

A twenty-first aspect of the embodiments of the present invention further provides a control node, including:

a processor, configured to detect whether a first triggering condition is met; and a transmitter, configured to send a first activation message to a device of a first cell when a first triggering condition is met, so that the device of the first cell sends an RG up instruction to a UE, where:

the first cell is a non-serving cell of the UE.

With reference to the twenty-first aspect, in a possible implementation manner, the transmitter is further configured to send a triggering instruction to a device of a second cell, so that the device of the second cell sends, to the UE through a High Speed Shared Control Channel HS-SCCH, a command that instructs the UE to monitor the RG up instruction of the first cell, where the second cell is a serving cell of the UE; or send a first Radio Resource Control Protocol RRC message to the UE, where the first RRC message is used to instruct the UE to monitor an RG up instruction of the first cell.

With reference to the twenty-first aspect and the foregoing possible implementation manner, in another possible implementation manner, that the first triggering condition is met includes the following:

the control node receives a message that a signal to interference ratio SIR of the UE is lower than a certain threshold, where the message is sent by the device of the second cell; and/or, the control node determines that a block error rate of uplink data of the second cell is higher than a certain threshold.

A twenty-second aspect of the embodiments of the present invention further provides a user equipment UE, including:

a receiver, configured to receive a High Speed Shared Control Channel HS-SCCH command sent by a device of a second cell, where the HS-SCCH command is used to instruct the UE to monitor an RG up instruction of a first cell; or receive a first Radio Resource Control Protocol RRC message sent by a control node, where the first RRC message includes the RG up instruction that instructs the UE to monitor the first cell; and a processor, configured to monitor the RG up instruction of the first cell, where:

the receiver is configured to receive the RG up instruction sent by a device of the first cell, and the first cell is a non-serving cell of the UE.

A twenty-third aspect of the embodiments of the present invention further provides a first cell, including:

a receiver, configured to receive a first activation message; and a transmitter, configured to send an RG up instruction to a user equipment UE after the receiver receives the first activation message, where the first cell is a non-serving cell of the UE.

A twenty-fourth aspect of the embodiments of the present invention further provides a second cell, including:

a processor, configured to detect a signal to interference ratio SIR of a user equipment UE; and a transmitter, configured to: when the signal to interference ratio SIR of the UE is lower than a certain threshold, send, to the UE through a High Speed Shared Control Channel HS-SCCH, a command that instructs the UE to monitor an RG up instruction of a first cell; or, after receiving a triggering instruction sent by a control node, send, to the UE through an HS-SCCH, a command that instructs the UE to monitor an RG up instruction of a first cell.

According to the uplink scheduling method and the control node provided in the embodiments of the present invention, when a UE adds a non-serving cell to an active set, the control node sends configuration information to the UE, so that the UE monitors a first control channel of a first cell according to the configuration information; in addition, the control node sends a first activation message to a device of the first cell so as to instruct the device of the first cell to send the first control channel to the UE, or sends the first activation message to the device of the first cell, so that the device of the first cell sends an RG up instruction to the UE. Compared with a method in which the UE adds the non-serving cell to the active set before generating uplink interference on the non-serving cell in the prior art, when a serving base station cannot receive uplink scheduling information of the UE, the UE may complete uplink transmission through scheduling of a base station of the non-serving cell or complete uplink data transmission through a change of a serving cell.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

FIG. 1 is a diagram of coverage areas of a serving cell, a non-serving cell, and a soft handover area;

FIG. 2 is a flowchart of an uplink scheduling method according to an embodiment of the present invention;

FIG. 3 is a flowchart of another uplink scheduling method according to another embodiment of the present invention;

FIG. 4 is a flowchart of another uplink scheduling method according to another embodiment of the present invention;

FIG. 5 is a flowchart of another uplink scheduling method according to another embodiment of the present invention;

FIG. 6 is a flowchart of another uplink scheduling method according to another embodiment of the present invention;

FIG. 7 is a flowchart of another uplink scheduling method according to another embodiment of the present invention;

FIG. 8 is a flowchart of another uplink scheduling method according to another embodiment of the present invention;

FIG. 9 is a flowchart of another uplink scheduling method according to another embodiment of the present invention;

Figure 10:
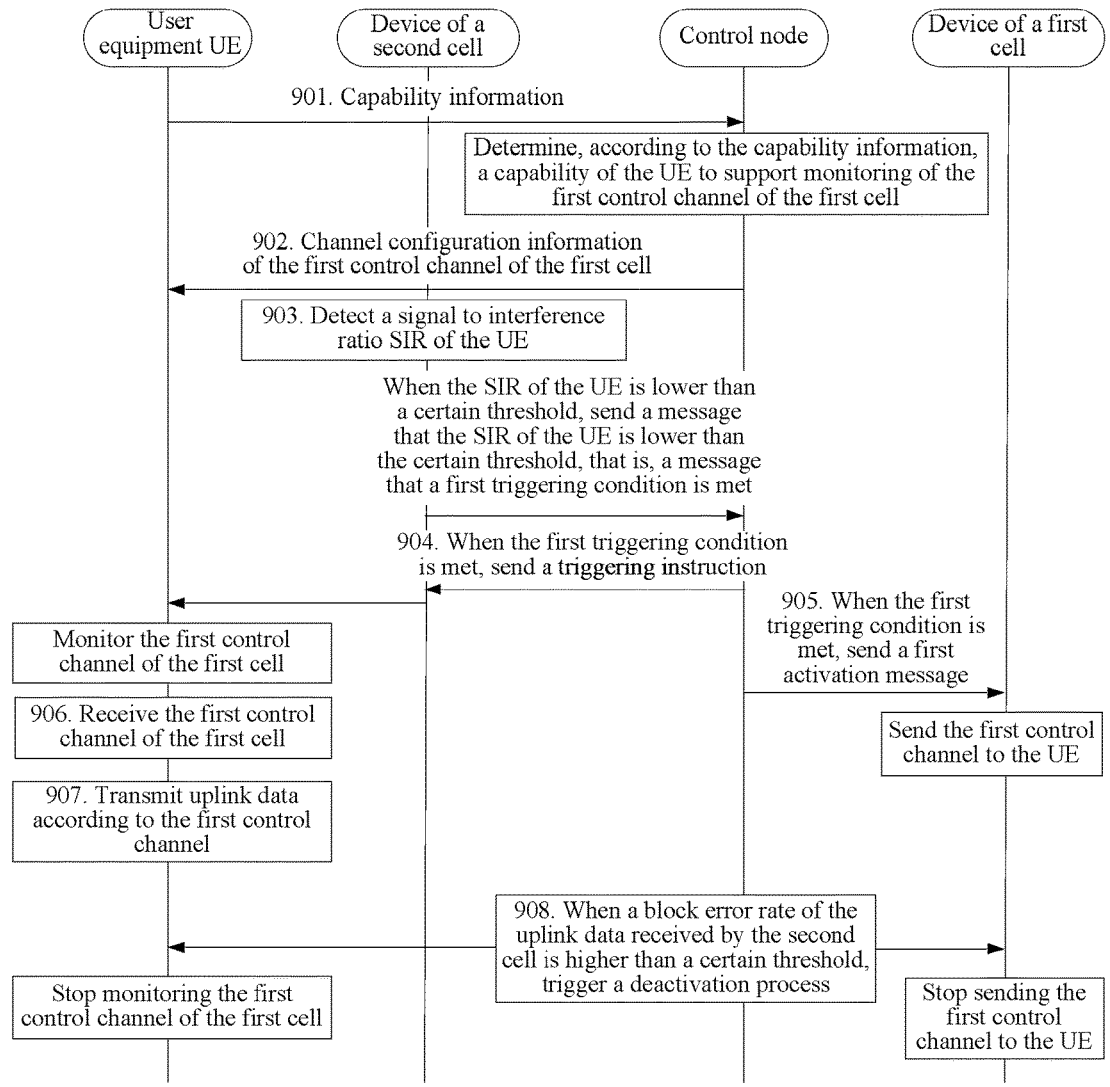
FIG. 10 is a flowchart of another uplink scheduling method according to another embodiment of the present invention.

FIG. a1 is a schematic structural diagram of a control node according to another embodiment of the present invention;

FIG. a2 is a schematic structural diagram of a user equipment UE according to another embodiment of the present invention;

FIG. a3 is a schematic structural diagram of a first cell according to another embodiment of the present invention;

FIG. a4 is a schematic structural diagram of a second cell according to another embodiment of the present invention;

FIG. a5 is a schematic structural diagram of another control node according to another embodiment of the present invention;

FIG. a6 is a schematic structural diagram of another user equipment UE according to another embodiment of the present invention;

FIG. a7 is a schematic structural diagram of another first cell according to another embodiment of the present invention;

FIG. a8 is a schematic structural diagram of another second cell according to another embodiment of the present invention;

FIG. b1 is a schematic structural diagram of another control node according to another embodiment of the present invention;

FIG. b2 is a schematic structural diagram of another user equipment UE according to another embodiment of the present invention;

FIG. b3 is a schematic structural diagram of another first cell according to another embodiment of the present invention;

FIG. b4 is a schematic structural diagram of another second cell according to another embodiment of the present invention;

FIG. b5 is a schematic structural diagram of another control node according to another embodiment of the present invention;

FIG. b6 is a schematic structural diagram of another user equipment UE according to another embodiment of the present invention;

FIG. b7 is a schematic structural diagram of another first cell according to another embodiment of the present invention; and FIG. b8 is a schematic structural diagram of another second cell according to another embodiment of the present invention.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Technologies described in this document may be applied to various communications systems, for example, current 2G and 3G communications systems and a next-generation communications system, for example, a Global System for Mobile communications (GSM, Global System for Mobile communications), a Code Division Multiple Access (CDMA, Code Division Multiple Access) system, a Time Division Multiple Access (TDMA, Time Division Multiple Access) system, Wideband Code Division Multiple Access (WCDMA, Wideband Code Division Multiple Access Wireless), a Frequency Division Multiple Access (FDMA, Frequency Division Multiple Access) system, an Orthogonal Frequency-Division Multiple Access (OFDMA, Orthogonal Frequency-Division Multiple Access) system, a single-carrier FDMA (SC-FDMA) system, a General Packet Radio Service (GPRS, General Packet Radio Service) system, a Long Term Evolution (LTE, Long Term Evolution) system, and other communications systems of this type.

This document describes various aspects with reference to a terminal, a base station, and/or a base station node.

A user equipment may be a wireless terminal or a wired terminal. A wireless terminal may be a device providing voice and/or data connectivity for a user, a handheld device having a wireless connection function, or another processing device connecting to a wireless modem. The wireless terminal may communicate with one or more core networks through a radio access network (RAN, Radio Access Network). The wireless terminal may be a mobile terminal, for example, a mobile phone (or called a "cellular" phone) or a computer equipped with a mobile terminal. For example, the wireless terminal may be a portable, pocket, handheld, computer-embedded, or vehicle-mounted mobile apparatus, which exchanges voice and/or data with the radio access network. For example, the wireless terminal may be a device such as a personal communication service (PCS, Personal Communication Service) phone, a cordless telephone set, a Session Initiation Protocol (SIP) phone, a wireless local loop (WLL, Wireless Local Loop) station, or a personal digital assistant (PDA, Personal Digital Assistant). The wireless terminal may also be called a system, a subscriber unit (Subscriber Unit), a subscriber station (Subscriber Station), a mobile station (Mobile Station), a mobile terminal, a remote station (Remote Station), an access point (Access Point), a remote terminal (Remote Terminal), an access terminal (Access Terminal), a user terminal (User Terminal), a user agent (User Agent), or a user equipment (User Equipment).

A base station (for example, an access point) may be a device that communicates with the wireless terminal through one or more sectors on an air interface on an access network. The base station may be used to perform conversion between a received air frame and an IP packet and act as a router between the wireless terminal and another part of the access network, where the another part of the access network may include an Internet Protocol (IP) network. The base station may further coordinate attribute management on the air interface. For example, the base station may be a base station (BTS, Base Transceiver Station) in the GSM or CDMA, a base station (NodeB) in the WCDMA, or an evolved base station (NodeB, eNB, or e-NodeB, evolved Node B) in the LTE. This is not limited in the present invention.

A base station controller (a source node or a destination node) may be a base station controller (BSC, base station controller) in the GSM or CDMA or a radio network controller (RNC, Radio Network Controller) in the WCDMA. This is not limited in the present invention.

In addition, the terms "system" and "network" in this document are usually interchangeable in this document. The term "and/or" in this document indicates only an association between associated objects and represents that three relationships may exist; for example, A and/or B may represent the following three cases: Only A exists, both A and B exist, and only B exists. In addition, the symbol "/" in this document generally represents that associated objects before and after the symbol are in an "or" relationship.

An embodiment of the present invention provides an uplink scheduling method shown in FIG. 2, including:

101. A control node sends configuration information to a user equipment (User Equipment, UE), so that the UE monitors a first control channel of a first cell according to the configuration information, where the configuration information includes channel configuration information of the first control channel of the first cell.

The first control channel may include: an E-DCH Absolute Grant Channel (E-DCH Absolute Grant Channel, E-AGCH) and/or an E-DCH Relative Grant Channel (E-DCH Relative Grant Channel, E-RGCH) that specifically refers to an instruction that an up instruction may be sent through the E-RGCH, such as RG-up. The E-DCH is an Enhanced Dedicated Transport Channel (Enhanced Dedicated Transport Channel, E-DCH).

A device in the present invention may refer to a micro cell base station, a macro cell base station, a base station with another communications standard, specification, or type, or a network device. The following embodiment uses that a micro cell base station serves as a device of a first cell and a macro cell base station serves as a device of a second cell as an example for description. The first cell that is a cell under control of the micro cell base station is called a micro cell, and the second cell that is a cell under control of the macro cell base station is called a macro cell. In this embodiment, a serving cell is the macro cell, and a non-serving cell is the micro cell. After the UE adds the micro cell to an active set in advance, the device of the second cell cannot receive or correctly demodulate uplink scheduling information of the UE, and therefore uplink scheduling cannot be performed for the UE. In this case, the UE can avoid, through scheduling of the device of the first cell or a change of a high speed uplink packet access (High Speed Uplink Packet Access, HSUPA) serving cell, a failure in proper and correct uplink data transmission due to a failure in uplink scheduling for the UE.

According to the uplink scheduling method provided in this embodiment of the present invention, when a UE adds a non-serving cell to an active set, a control node sends configuration information to the UE, so that the UE can monitor a first control channel of a first cell; in addition, the control node sends a first activation message to a device of the first cell so as to instruct the device of the first cell to send the first control channel to the UE. Compared with a method in which the UE adds the non-serving cell to the active set before generating uplink interference on the non-serving cell in the prior art, when a serving base station cannot receive uplink scheduling information of the UE, the UE may complete uplink transmission through scheduling of a base station of the non-serving cell or complete uplink data transmission through a change of an uplink serving cell.

Another embodiment of the present invention provides an uplink scheduling method shown in FIG. 3, including:

201. A user equipment UE receives configuration information sent by a control node, where the configuration information includes channel configuration information of a first control channel of a first cell.

The configuration information sent by the control node may include at least one group of channel configuration information of the first control channel of the first cell. In the one group or multiple groups of channel configuration information of the first control channel, if multiple groups of available channel configuration of the first control channel are included, in a triggering process, a device of a second cell or the control node may first determine, together with the device of the first cell, a group of available configuration information and to notify the UE and then execute the following uplink scheduling process.

202. The UE monitors the first control channel of the first cell according to the configuration information.

The first control channel may include an E-AGCH and/or an up instruction of an E-RGCH, and the first cell is a non-serving cell of the UE.

According to the uplink scheduling method provided in this embodiment of the present invention, when a UE adds a non-serving cell to an active set, the UE receives configuration information sent by a control node and monitors a first control channel of a first cell according to channel configuration information of the first control channel of the first cell in the configuration information. Compared with a method in which the UE adds the non-serving cell to the active set before generating uplink interference on the non-serving cell in the prior art, when a serving base station cannot receive uplink scheduling information of the UE, the UE may complete uplink transmission through scheduling of a base station of the non-serving cell or complete uplink data transmission through a change of a serving cell.

Another embodiment of the present invention provides an uplink scheduling method shown in FIG. 4, including:

301. When a first triggering condition is met, a device of a first cell receives a first activation message, where the first activation message is used to instruct the device of the first cell to send a first control channel to the UE.

That the first triggering condition is met may include the following: a message that a signal to interference ratio (Signal to Interference Ratio, SIR) of the UE is lower than a certain threshold is received, where the message is sent by a device of a second cell, and/or, a control node determines that a block error rate of uplink data of the second cell is higher than a certain threshold. Specifically, the SIR of the UE may be obtained through monitoring performed by the device of the second cell or may also be measured and reported by the UE. Certainly, other methods, such as triggering performed by the control node or triggering performed by the device of the second cell, may be included. The control node may measure the block error rate of the uplink data that is received by the device of the second cell within a certain time segment and determine whether the block error rate exceeds the certain threshold. The related threshold may be obtained through preconfiguration.

302. The device of the first cell sends the first control channel to the UE, where the first control channel includes an E-DCH Absolute Grant Channel E-AGCH.

The device of the first cell may determine an uplink scheduling rule of a UE according to factors such as channel quality of the UE and a load condition of the first cell, and perform proper uplink scheduling for the UE by sending the first control channel to the UE. Alternatively, a manner of changing the uplink serving cell may be used and therefore the UE may receive the first control channel by using the device of the first cell. Specifically, the control node sends the first activation message to the device of the first cell, so that the device of the first cell uses the first cell as an HSUPA serving cell of the UE to send the first control channel to the UE, where the first activation message includes an instruction that the HSUPA serving cell of the UE changes.

According to the uplink scheduling method provided in this embodiment of the present invention, when a first triggering condition is met, a first activation message is received and a first control channel is sent to a UE according to an instruction of the first activation message. Compared with a method in which the UE adds a non-serving cell to an active set before generating uplink interference on the non-serving cell in the prior art, when a serving base station cannot receive uplink scheduling information of the UE, the UE may complete uplink transmission through scheduling of a base station of the non-serving cell or complete uplink data transmission through a change of a serving cell.

Another embodiment of the present invention provides an uplink scheduling method shown in FIG. 5, including:

401. A device of a second cell sends, to a UE through a High Speed Shared Control Channel (High Speed Shared Control Channel, HS-SCCH), a command that instructs the UE to monitor a first control channel of a first cell, where the device of the second cell sends, to the UE through the High Speed Shared Control Channel HS-SCCH, the command that instructs the UE to monitor the first control channel of the first cell.

The first control channel includes an E-DCH Absolute Grant Channel E-AGCH, and the first cell is a non-serving cell of the UE.

A specific implementation method for sending, by the device of the second cell to the UE through the HS-SCCH, the command that instructs the UE to monitor the first control channel of the first cell may include the following: the device of the second cell may monitor an SIR of the UE and determine whether the SIR is lower than a certain threshold; and, when the SIR is lower than the certain threshold, the device of the second cell directly triggers, by using an HS-SCCH command, the command that the UE monitor the first control channel of the first cell. In this implementation method, no control node is required to send a triggering instruction to the device of the second cell. However, in another implementation method for sending, by the device of the second cell to the UE through the HS-SCCH, the command that instructs the UE to monitor the first control channel of the first cell, the control node may measure a block error rate of uplink data that is received by the second cell within a certain time segment, determine whether the block error rate exceeds a certain threshold, and, when the block error rate of the received uplink data exceeds the certain threshold, send the triggering instruction to the device of the second cell; and after receiving the triggering instruction, the device of the second cell triggers, by using the HS-SCCH command, the UE to monitor the first control channel of the first cell.

According to the uplink scheduling method provided in this embodiment of the present invention, a device of a second cell sends, to a UE through an HS-SCCH, a command that instructs the UE to monitor a first control channel of a first cell. Compared with a method in which the UE adds a non-serving cell to an active set before generating uplink interference on the non-serving cell in the prior art, when a serving base station cannot receive uplink scheduling information of the UE, the UE may complete uplink transmission through scheduling of a base station of the non-serving cell or complete uplink data transmission through a change of a serving cell.

Another embodiment of the present invention provides an uplink scheduling method shown in FIG. 6, including:

501. When a first triggering condition is met, a control node sends a first activation message to a device of a first cell, so that the device of the first cell sends an RG up instruction to a UE.

After receiving the first activation message sent by the control node, the device of the first cell may determine an uplink scheduling rule of a UE according to factors such as channel quality of the UE and a load condition of the first cell, and perform proper uplink scheduling for the UE by sending the RG up instruction to the UE.

That the first triggering condition is met may include the following: the control node receives a message that an SIR of the UE is lower than a certain threshold, where the message is sent by a device of a second cell; and/or, the control node determines that a block error rate of uplink data of the second cell is higher than a certain threshold.

According to the uplink scheduling method provided in this embodiment of the present invention, when a first triggering condition is met, a first activation message is sent to a device of a first cell, so that the device of the first cell sends an RG up instruction to an UE. Compared with a method in which the UE adds a non-serving cell to an active set before generating uplink interference on the non-serving cell in the prior art, when a serving base station cannot receive uplink scheduling information of the UE, the UE may receive the RG up instruction sent by the base station of the non-serving cell and perform uplink scheduling so as to complete uplink transmission.

Another embodiment of the present invention provides an uplink scheduling method shown in FIG. 7, including:

601. A UE receives an RG up instruction sent by a device of a first cell, where the first cell is a non-serving cell of the UE.

After receiving the RG up instruction sent by the device of the first cell, the UE may perform proper uplink scheduling according to the RG up instruction so as to complete uplink data transmission.

According to the uplink scheduling method provided in this embodiment of the present invention, uplink scheduling may be performed by receiving an RG up instruction sent by a device of a first cell. Compared with a method in which a UE adds a non-serving cell to an active set before generating uplink interference on the non-serving cell in the prior art, when a serving base station cannot receive uplink scheduling information of the UE, the UE may receive the RG up instruction sent by the base station of the non-serving cell and perform uplink scheduling so as to complete uplink transmission.

Another embodiment of the present invention provides an uplink scheduling method shown in FIG. 8, including:

701. A device of a first cell sends an RG up instruction to an UE after receiving a first activation message.

The first cell is a non-serving cell of the UE.

According to the uplink scheduling method provided in this embodiment of the present invention, after receiving a first activation message sent by a control node, a device of a first cell sends an RG up instruction to a UE to perform uplink scheduling. Compared with a method in which the UE adds a non-serving cell to an active set before generating uplink interference on the non-serving cell in the prior art, when a serving base station cannot receive uplink scheduling information of the UE, the UE may receive the RG up instruction sent by the base station of the non-serving cell and perform uplink scheduling so as to complete uplink transmission.

Another embodiment of the present invention provides an uplink scheduling method shown in FIG. 9, including:

801. A device of a second cell detects an SIR of a UE, and, when the SIR of the UE is lower than a certain threshold, sends, to the UE through an HS-SCCH, a command that instructs the UE to monitor an RG up instruction of a first cell.

Step 801 may be replaced with the following: after receiving a triggering instruction sent by a control node, a device of a second cell sends, to the UE through the HS-SCCH, a command that instructs the UE to monitor an RG up instruction of a first cell.

A specific implementation method for sending, by the device of the second cell to the UE through the HS-SCCH after the device of the second cell receives the triggering instruction sent by the control node, the command that instructs the UE to monitor the RG up instruction of the first cell may be as follows: the control node measures a block error rate of uplink data that is received by the second cell within a certain time segment, determine whether the block error rate exceeds a certain threshold, and, when the block error rate of the received uplink data exceeds the certain threshold, send the triggering instruction to the device of the second cell; and after receiving the triggering instruction, the device of the second cell triggers, by using the HS-SCCH command, the command that the UE monitor the RG up instruction of the first cell.

According to the uplink scheduling method provided in this embodiment of the present invention, a device of a second cell may detect an SIR of a UE, and, when the SIR of the UE is lower than a certain threshold, send, to the UE through the HS-SCCH, a command that instructs the UE to monitor an RG up instruction of a first cell. Compared with a method in which the UE adds a non-serving cell to an active set before generating uplink interference on the non-serving cell in the prior art, when a serving base station cannot receive uplink scheduling information of the UE, the UE may receive the RG up instruction sent by the base station of the non-serving cell and perform uplink scheduling so as to complete uplink transmission.

Another embodiment of the present invention provides an uplink scheduling method shown in FIG. 10, including:

901. A UE reports capability information of supporting monitoring of a first control channel of a first cell to a control node, so that the control node determines, according to the capability information, a capability of the UE to support monitoring of the first control channel of the first cell.

The capability information is used to determine the capability of the UE to support monitoring of the first control channel of the first cell. The purpose for the control node to receive the capability information reported by the UE is to determine, before the uplink scheduling method is initiated, the capability of the UE to support monitoring of the first control channel of the first cell, report whether the UE has a capability to support the uplink transmission method, execute the foregoing uplink scheduling process if the UE has the capability to support the uplink transmission method, and end the uplink scheduling process if the UE is not capable of supporting the uplink transmission method.

In this embodiment, step 901 is an optional step. In this embodiment, step 901 may not be executed, and step 902 is directly executed.

902. The control node sends configuration information to the UE, where the configuration information includes channel configuration information of the first control channel of the first cell.

When the UE adds the first cell to an active set, the control node sends the configuration information, where the configuration information may include at least one group of channel configuration information of the first control channel of the first cell. In the one group or multiple groups of channel configuration information of the first control channel, at least one group of available channel configuration of the first control channel is included. In a triggering process, a device of a second cell or the control node may first determine, together with the device of the first cell, a group of configuration information and then execute the following uplink scheduling process.

903. The device of the second cell detects an SIR of the UE, and when the SIR of the UE is lower than a certain threshold, sends the control node a message that the SIR of the UE is lower than the certain threshold, that is, a message that a first triggering condition is met.

The device of the second cell may monitor the SIR of the UE and determine whether the SIR is lower than the certain threshold. When the SIR is lower than the certain threshold, the device of the second cell directly triggers, by using an HS-SCCH command, the UE to monitor the first control channel of the first cell. In this case, no control node is required to send a triggering instruction to the device of the second cell.

The SIR of the UE may be obtained through monitoring performed by the device of the second cell or may also be measured and reported by the UE. Certainly, other methods, such as triggering performed by the control node or triggering performed by the device of the second cell, may be included.

Further, step 903 may be replaced with the following: the control node determines whether a block error rate of uplink data of the second cell is higher than a certain threshold, and when the block error code is higher than the certain threshold (that is, the first triggering condition is met), step 904 is executed.

The control node may measure the block error rate of the uplink data that is received by the device of the second cell within a certain time segment, determine whether the block error rate exceeds the certain threshold, and when the block error rate of the uplink data of the second cell is higher than the certain threshold, send the triggering instruction to the device of the second cell; and after receiving the triggering instruction, the device of the second cell triggers, by using the HS-SCCH command, the UE to monitor the first control channel of the first cell.

904. When the first triggering condition is met, the control node sends the triggering instruction to the device of the second cell, so that the device of the second cell sends, to the UE through the HS-SCCH, a command that instructs the UE to monitor the first control channel of the first cell and the UE monitors the first control channel of the first cell according to the configuration information, where the second cell is a serving cell of the UE.

That the first triggering condition is met may be that the control node receives a message that the SIR of the UE is lower than the certain threshold, where the message is sent by the device of the second cell, or may also be that the control node measures the block error rate of the uplink data received by the device of the second cell and determines that the block error rate is higher than the certain threshold.

Further, correspondingly, step 904 may be replaced with the following: when the first triggering condition is met, the device of the second cell sends, to the UE through the HS-SCCH, a command that instructs the UE to monitor the first control channel of the first cell. In this implementation method, no control node is required to send the triggering instruction to the device of the second cell. That the first triggering condition is met may include the following: the device of the second cell detects that the SIR of the UE is lower than the certain threshold and receives a message that the control node determines that the block error rate of the uplink data of the second cell is higher than the certain threshold.

Further, the monitoring, by the UE, the first control channel of the first cell according to the configuration information may further include: receiving the RG up instruction sent by the first cell.

Further, the monitoring, by the UE, the first control channel of the first cell according to the configuration information may further include the following: the uplink serving cell is switched to the first cell, that is, an HSUPA serving cell of the UE is changed to the non-serving cell. When the UE switches the HSUPA serving cell to the first cell according to an instruction of the control node or the device of the second cell, no control node or no device of the second cell is required to send the command that instructs the UE to monitor the first control channel of the first cell to the UE, and the UE may simultaneously monitor the E-AGCH of the first control channel of the first cell and an up instruction of the E-RGCH.

905. When the first triggering condition is met, the control node sends a first activation message to the device of the first cell, so that the device of the first cell sends the first control channel to the UE.

Corresponding to two scenarios in which the first triggering condition is met in step 904, the method for sending, by the control node, the first activation message to the device of the first cell may further include the following: the control node forwards the first activation message to the device of the first cell when receiving the first activation message sent by the device of the second cell.

In this embodiment, when the first activation message is sent to the device of the first cell, step 904 includes two sending manners and one of the manners may be selected according to actual needs.

Alternatively, the device of the second cell may directly send the first activation message to the device of the first cell.

It should be noted that no sequence exists for executing steps 903-904 and step 905. Step 905 may be executed after steps 903-904 are executed; steps 903-904 may be executed after step 905 is executed; or any one of step 904 and step 905 is executed after step 903 is executed.

906. The UE receives the first control channel sent by the device of the first cell.

Correspondingly, the receiving, by the UE, the first control channel sent by the first cell may be implemented by using two manners and a specific receiving manner may include: receiving, by the UE, uplink scheduling of the device of the first cell and changing the HSUPA serving cell of the UE to the non-serving cell. In either manner, the UE can receive the E-AGCH of the non-downlink-serving cell and/or the up instruction of the E-RGCH.

907. The UE transmits uplink data according to the first control channel.

The first control channel may include the E-AGCH that is calculated by the device of the first cell and allocated to the UE and/or the up instruction of the E-RGCH, and the first control channel is used to limit an uplink scheduling rule of the UE. For example, in the uplink scheduling rule of the UE, parameters, such as uplink sending power, uplink sending data block length, and occupied time-frequency resources of the UE, may be configured. The UE may transmit the uplink data according to the E-AGCH delivered by the device of the first cell and/or the up instruction of the E-RGCH, thereby avoiding a relatively large impact on the first cell and ensuring correct and proper uplink transmission.

Further alternatively, when the device of the second cell is capable of receiving the uplink scheduling information of the UE and the UE is capable of transmitting the uplink data, the method in this embodiment may further include step 908.

908. Trigger a deactivation process, so that the UE stops monitoring the first control channel of the first cell and the device of the first cell stops sending the first control channel to the UE.

In this embodiment, a specific method of the deactivation process may be as follows: when determining that the SIR of the UE exceeds the certain threshold, the device of the second cell triggers the deactivation process by using the HS-SCCH command, so that the UE stops monitoring the first control channel of the first cell and the device of the first cell stops sending the first control channel to the UE. A condition for triggering the deactivation process may further be as follows: when the control node measures that the block error rate of the uplink data received by the device of the second cell is lower than the certain threshold, the deactivation process is triggered. The condition for triggering the deactivation process may further be as follows: when a high speed downlink packet access (High Speed Downlink Packet Access, HSDPA) serving cell of the UE changes, the deactivation process is triggered. For example, according to the method provided in this embodiment of the present invention, when the UE detects and reports that signal quality of the first cell is relatively good, the HSDPA serving cell of the UE may be switched to the first cell with relatively good signal quality; however, when the UE position moves, the UE reselects or switches to another cell, that is, the HSDPA serving cell of the UE changes, the first cell may not need to serve as the HSDPA serving cell of the UE, and then deactivation is performed.

It should be noted that for detailed descriptions of some steps, reference may be made to corresponding content in other embodiments of the present invention, and for detailed descriptions of some parameters and processes, no further details are provided in this embodiment of the present invention.

According to the control node provided in this embodiment of the present invention, when a UE adds a non-serving cell to an active set, the control node sends configuration information to the UE, so that the UE monitors a first control channel of the first cell according to the configuration information; in addition, the control node sends a first activation message to a device of the first cell so as to instruct the device of the first cell to send the first control channel to the UE. Compared with a method in which the UE adds the non-serving cell to the active set before generating uplink interference on the non-serving cell in the prior art, when a serving base station cannot receive uplink scheduling information of the UE, the UE may complete uplink transmission through scheduling of a base station of the non-serving cell or complete uplink data transmission through a change of a serving cell.

Figure 11:
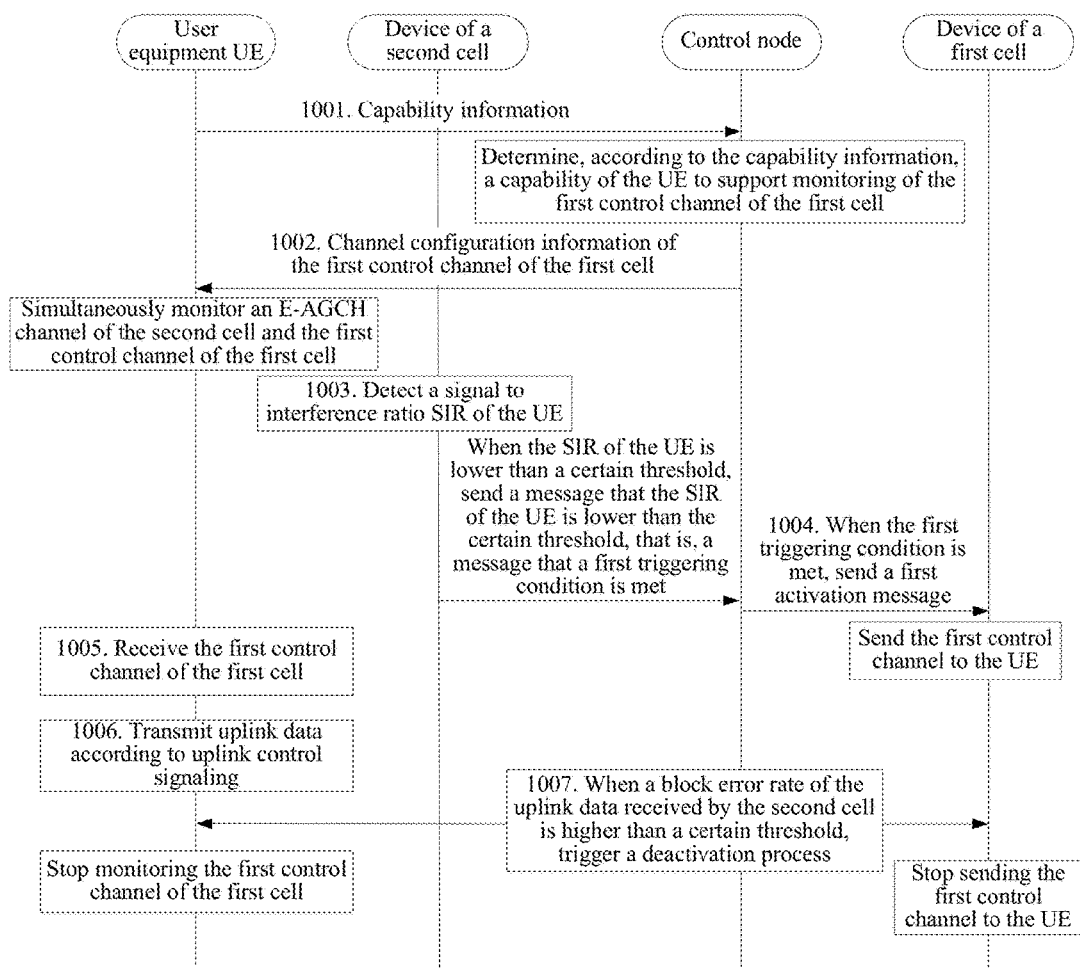
FIG. 11 is a flowchart of another uplink scheduling method according to another embodiment of the present invention.

Another embodiment of the present invention provides an uplink scheduling method shown in FIG. 11, including:

1001. A UE reports capability information of supporting monitoring of a first control channel of a first cell to a control node, so that the control node determines, according to the capability information, a capability of the UE to support monitoring of the first control channel of the first cell.

In this embodiment, step 1001 is an optional step. In this embodiment, step 1001 may not be executed, and step 1002 is directly executed.

1002. The control node sends channel configuration information of the first cell to the UE, so that the UE simultaneously monitors an E-AGCH of a second cell and the first control channel of the first cell.

If the UE simultaneously monitors the second cell and the first control channel of the first cell, a control channel that includes a relatively small service grant value is preferentially used or uplink scheduling of a device of the second cell is preferentially received.

1003. The device of the second cell detects an SIR of the UE, and, when the SIR of the UE is lower than a certain threshold, sends the control node a message that the SIR of the UE is lower than the certain threshold, that is, a message that a first triggering condition is met.

1004. When the first triggering condition is met, the control node sends a first activation message to the device of the first cell, so that the device of the first cell sends the first control channel to the UE.

It should be noted that no sequence exists for executing step 1002 and steps 1003-1004. Steps 1003-1004 may be executed after step 1002 is executed; or step 1002 is executed after steps 1003-1004 are executed. The sequence for executing step 1002 and steps 1003-1004 does not affect an uplink scheduling result in this embodiment.

1005. The UE receives the first control channel of the first cell.

It should be noted that the UE still simultaneously receives the E-AGCH of the second cell and the first control channel of the first cell; however, if the device of the second cell does not send the E-AGCH to the device of the second cell or the UE cannot receive the E-AGCH of the second cell in this case, the UE can only receive the uplink scheduling of the device of the first cell, where the first control channel of the first cell may include the E-AGCH and/or an up instruction of the E-RGCH.

1006. The UE transmits uplink data according to the first control channel.

Further alternatively, when the device of the second cell is capable of receiving the uplink scheduling information of the UE and the UE is capable of transmitting the uplink data, the method in this embodiment may further include step 1007.

1007. Trigger a deactivation process, so that the UE stops monitoring the first control channel of the first cell and the device of the first cell stops sending the first control channel to the UE.

It should be noted that for detailed descriptions of some steps, reference may be made to corresponding content in other embodiments of the present invention, and for detailed descriptions of some parameters and processes, no further details are provided in this embodiment of the present invention.

According to the control node provided in this embodiment of the present invention, when a UE adds a non-serving cell to an active set, the control node sends configuration information to the UE, so that the UE monitors a first control channel of the first cell according to the configuration information; in addition, the control node sends a first activation message to a device of the first cell so as to instruct the device of the first cell to send the first control channel to the UE. Compared with a method in which the UE adds the non-serving cell to the active set before generating uplink interference on the non-serving cell in the prior art, when a serving base station cannot receive uplink scheduling information of the UE, the UE may complete uplink transmission through scheduling of a base station of the non-serving cell or complete uplink data transmission through a change of a serving cell.

Figure 12:
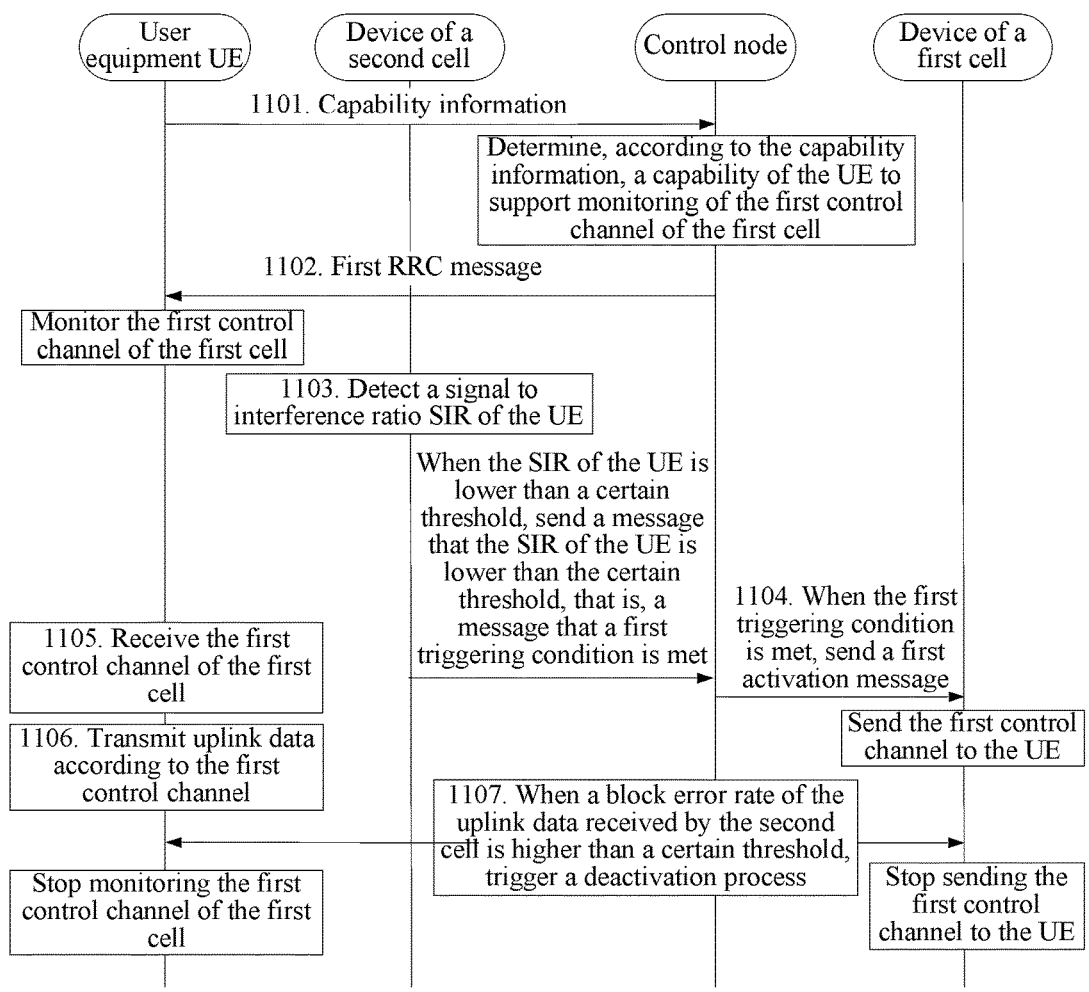
FIG. 12 is a flowchart of another uplink scheduling method according to another embodiment of the present invention.

Another embodiment of the present invention provides an uplink scheduling method shown in FIG. 12, including:

1101. A UE reports capability information of supporting monitoring of a first control channel of a first cell to a control node, so that the control node determines, according to the capability information, a capability of the UE to support monitoring of the first control channel of the first cell.

In this embodiment, step 1101 is an optional step. In this embodiment, step 1101 may not be executed, and step 1102 is directly executed.

1102. The control node sends a first Radio Resource Control Protocol (Radio Resource Control, RRC) message to the UE, so that the UE monitors the first control channel of the first cell according to an instruction of the first RRC message.

The first RRC message may include channel configuration information of the first control channel of the first cell, and the UE may monitor the first control channel of the first cell according to the channel configuration information of the first control channel.

1103. A device of a second cell detects an SIR of the UE, and, when the SIR of the UE is lower than a certain threshold, sends the control node a message that the SIR of the UE is lower than the certain threshold, that is, a message that a first triggering condition is met.

1104. When the first triggering condition is met, the control node sends a first activation message to the device of the first cell, so that the device of the first cell sends the first control channel to the UE.

1105. The UE receives the first control channel of the device of the first cell.

The first control channel of the first cell may include the E-AGCH and/or an up instruction of the E-RGCH.

1106. The UE transmits uplink data according to the first control channel.

Further alternatively, when the device of the second cell is capable of receiving the uplink scheduling information of the UE and the UE is capable of transmitting the uplink data, the method in this embodiment may further include step 1107.

1107. The UE triggers a deactivation process, so that the UE stops monitoring downlink control signaling of the first cell and the device of the first cell stops sending the downlink control signaling to the UE.

Except the specific deactivation method described in step 908, a specific deactivation method may further include the following:

The control node may measure a block error rate of uplink data received by the device of the second cell and determine whether the block error rate is lower than a certain threshold, and when the block error rate of the received uplink data is lower than the certain threshold, the control node sends the first RRC message to the UE, where the first RRC message may include a triggering instruction that may trigger the deactivation process; or, the serving cell may monitor the SIR of the UE and determine whether the SIR exceeds the certain threshold, and when the SIR exceeds the certain threshold, the device of the second cell instructs the control node to trigger the deactivation process.

It should be noted that for detailed descriptions of some steps, reference may be made to corresponding content in other embodiments of the present invention, and for detailed descriptions of some parameters and processes, no further details are provided in this embodiment of the present invention.

According to the control node provided in this embodiment of the present invention, when a UE adds a non-serving cell to an active set, the control node sends configuration information to the UE, so that the UE monitors a first control channel of the first cell according to the configuration information; in addition, the control node sends a first activation message to a device of the first cell so as to instruct the device of the first cell to send the first control channel to the UE. Compared with a method in which the UE adds the non-serving cell to the active set before generating uplink interference on the non-serving cell in the prior art, when a serving base station cannot receive uplink scheduling information of the UE, the UE may complete uplink transmission through scheduling of a base station of the non-serving cell or complete uplink data transmission through a change of a serving cell.

Figure 13:
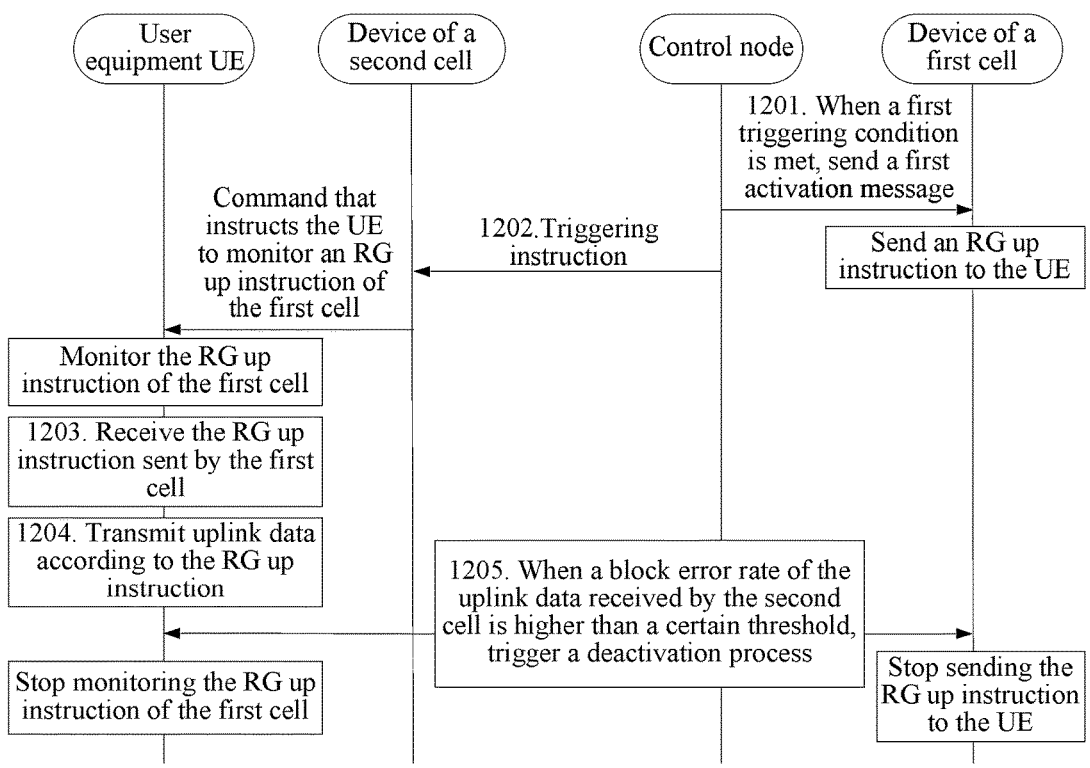
FIG. 13 is a flowchart of another uplink scheduling method according to another embodiment of the present invention.

Another embodiment of the present invention provides an uplink scheduling method shown in FIG. 13, including:

1201. When a first triggering condition is met, a control node sends a first activation message to a device of a first cell, so that the device of the first cell sends an RG up instruction to the UE.

The first cell is a non-serving cell of the UE. That the first triggering condition is met may include the following: the control node receives a message that an SIR of the UE is lower than a certain threshold, where the message is sent by a device of a second cell; and/or, the control node determines that a block error rate of uplink data of the second cell is higher than a certain threshold.

Further, corresponding to the first triggering condition, step 1201 may be replaced with the following: when a first triggering condition is met, a device of a second cell sends a first activation message to a device of a first cell, so that the device of the first cell sends an RG up instruction to the UE.

1202. The control node sends a triggering instruction to the device of the second cell, so that the device of the second cell sends, to the UE through the HS-SCCH, a command that instructs the UE to monitor the RG up instruction of the first cell and the UE monitors a first control channel of the first cell according to the configuration information.

The second cell is a serving cell of the UE. According to another method for triggering the device of the second cell to send, to the UE through the HS-SCCH, the command that instructs the UE to monitor the RG up instruction of the first cell, no control node is required to send the triggering instruction to the second cell. However, the device of the second cell detects the SIR of the UE, and, when the SIR of the UE is lower than the certain threshold, sends, to the UE through the HS-SCCH, the command that instructs the UE to monitor the RG up instruction of the first cell.

Further, step 1202 may be replaced with the following: the control node sends a first RRC message to the UE, where the first RRC message is used to instruct the UE to monitor the RG up instruction of the first cell.

It should be noted that no sequence exists for executing step 1201 and step 1202. Step 1202 may be executed after step 1201 is executed; or step 1201 may be executed after step 1202 is executed. The sequence for executing step 1201 and step 1202 does not affect an uplink scheduling result.

1203. The UE receives the RG up instruction sent by the device of the first cell.

The first cell is a non-serving cell of the UE.

1204. The UE transmits uplink data according to the RG up instruction.

Further alternatively, when the device of the second cell is capable of receiving the uplink scheduling information of the UE and the UE is capable of transmitting the uplink data, the method in this embodiment may further include step 1205.

1205. Trigger a deactivation process, so that the UE stops monitoring the RG up instruction of the first cell and the device of the first cell stops sending the RG up instruction to the UE.

A specific method of the deactivation process may be as follows: when determining that the SIR of the UE exceeds the certain threshold, the device of the second cell triggers the deactivation process by using the HS-SCCH command, so that the UE stops monitoring the RG up instruction of the first cell and the device of the first cell stops sending the RG up instruction to the UE. A condition for triggering the deactivation process may further be as follows: when the control node measures that the block error rate of the uplink data received by the second cell is lower than the certain threshold, the deactivation process is triggered. The condition for triggering the deactivation process may further be as follows: when an HSDPA serving cell of the UE changes, the deactivation process is triggered. For example, according to the method provided in this embodiment of the present invention, when the UE detects and reports that signal quality of the first cell is relatively good, the HSDPA serving cell of the UE may be switched to the first cell with relatively good signal quality; however, when the UE position moves, the UE reselects or switches to another cell, that is, the HSDPA serving cell of the UE changes, the first cell may not need to serve as the HSDPA serving cell of the UE, and then deactivation is performed.

It should be noted that for detailed descriptions of some steps, reference may be made to corresponding content in other embodiments of the present invention, and for detailed descriptions of some parameters and processes, no further details are provided in this embodiment of the present invention.

Further, it should be noted that all the three foregoing embodiments relate to a process of interaction between the second cell and the first cell and because three different structures between the second cell and the first cell may exist currently, a path and a method of a message or an instruction are different according to the different structures. For example, in an architecture in which a micro cell and a macro cell share a same control node and the micro cell directly interacts with the control node by using a Iub interface, the second cell (the macro cell) directly sends triggering signaling to the control node through the Iub interface, and then the control node forwards the signaling to the first cell (the micro cell). Similarly, corresponding to other different macro-micro structures, manners of transferring signaling or a message are different. For a specific transfer process, no further details are provided in this embodiment of the present invention.

According to the uplink scheduling method provided in this embodiment of the present invention, when a first triggering condition is met, a first activation message is sent to a device of a first cell, so that the device of the first cell sends an RG up instruction to the UE. Compared with a method in which the UE adds a non-serving cell to an active set before generating uplink interference on the non-serving cell in the prior art, when a serving base station cannot receive uplink scheduling information of the UE, the UE may receive the RG up instruction sent by the base station of the non-serving cell and perform uplink scheduling so as to complete uplink transmission.

Another embodiment of the present invention provides a control node shown in FIG. a1, including: a storing unit A11 and a sending unit A12.

The storing unit A11 is configured to store configuration information.

The first sending unit A12 is configured to send the configuration information stored in the storing unit A11 to the UE, so that the UE monitors a first control channel of a first cell according to the configuration information, where the configuration information includes channel configuration information of the first control channel of the first cell, the first control channel includes an E-DCH Absolute Grant Channel E-AGCH, and the first cell is a non-serving cell of the UE.

Further, the control node may further include: a second sending unit A13.

The second sending unit A13 is configured to send a first activation message to a device of the first cell after the first sending unit A12 sends the configuration information to the UE and when a first triggering condition is met, where the first activation message is used to instruct the device of the first cell to send the first control channel to the UE.

Further alternatively, in an application scenario of this embodiment, the control node may further include: a third sending unit A14.

The third sending unit A14 is configured to send a triggering instruction to a device of a second cell after the first sending unit A12 sends the configuration information to the user equipment UE and when the first triggering condition is met, so that the device of the second cell sends, to the UE through a High Speed Shared Control Channel HS-SCCH, a command that instructs the UE to monitor the first control channel of the first cell, where the second cell is a serving cell of the UE.

Further, the control node may further include: a triggering unit A15.

The triggering unit A15 is configured to detect whether the first triggering condition is met.

That the first triggering condition is met includes the following: the control node receives a message that a signal to interference ratio SIR of the UE is lower than a certain threshold, where the message is sent by the device of the second cell; and/or, the control node determines that a block error rate of uplink data of the second cell is higher than a certain threshold.

Further alternatively, in another application scenario of this embodiment, the first sending unit A12 may include: a first sending module A121.

The first sending module A121 is configured to send the channel configuration information of the first cell to the UE, so that the UE simultaneously monitors an E-AGCH of the serving cell and the first control channel of the first cell.

Further alternatively, in another application scenario of this embodiment, the first sending unit A12 may include: a second sending module A122.

The second sending module A122 is configured to send a first RRC message to the UE, where the first RRC message is used to instruct the UE to monitor the first control channel of the first cell.

Further, the control node may further include: a receiving unit A16.

The receiving unit A16 is configured to: before the first sending unit A12 sends the configuration information to the UE, receive capability information reported by the UE, where the capability information is used to determine a capability of the UE to support monitoring of the first control channel of the first cell.

It should be noted that for detailed descriptions of some functional modules of the control node provided in this embodiment of the present invention, reference may be made to corresponding content in the method embodiments. No further details are provided in this embodiment.

According to the control node provided in this embodiment of the present invention, when a UE adds a non-serving cell to an active set, the control node sends configuration information to the UE, so that the UE monitors a first control channel of the first cell according to the configuration information; in addition, the control node sends a first activation message to a device of the first cell so as to instruct the device of the first cell to send the first control channel to the UE. Compared with a method in which the UE adds the non-serving cell to the active set before generating uplink interference on the non-serving cell in the prior art, when a serving base station cannot receive uplink scheduling information of the UE, the UE may complete uplink transmission through scheduling of a base station of the non-serving cell or complete uplink data transmission through a change of a serving cell.

Another embodiment of the present invention further provides a user equipment UE shown in FIG. a2, including: a first receiving unit A21 and a monitoring unit A22.

The first receiving unit A21 is configured to receive configuration information sent by a control node, where the configuration information includes channel configuration information of a first control channel of a first cell.

The monitoring unit A22 is configured to monitor the first control channel of the first cell according to the configuration information, where the first control channel includes an E-DCH Absolute Grant Channel E-AGCH and the first cell is a non-serving cell of the UE.

Further alternatively, in an application scenario of this embodiment, the UE may further include: a second receiving unit A23.

The second receiving unit A23 is configured to: after the first receiving unit A21 receives the configuration information sent by the control node, receive, through a High Speed Shared Control Channel HS-SCCH, a command that instructs the UE to monitor the first control channel of the first cell according to the configuration information.

Further, in an application scenario of this embodiment, the second receiving unit A23 is further configured to receive a first RRC message sent by the control node, where the first RRC message is used to instruct the UE to monitor the first control channel of the first cell.

Further alternatively, in an application scenario of this embodiment, the monitoring unit A22 may include: a receiving module A221.

The receiving module A221 is configured to receive an RG up instruction sent by a device of the first cell.

Further alternatively, in another application scenario of this embodiment, the monitoring unit A22 may further include: a switching module A222.

The switching module A222 is configured to switch an uplink serving cell to the first cell.

Further alternatively, in another application scenario of this embodiment, the monitoring unit A22 further includes: a monitoring module A223.

The monitoring module A223 is configured to simultaneously monitor an E-AGCH of a second cell and the first control channel of the first cell, where the second cell is a serving cell of the UE.

Further, the UE further includes:
a sending unit A24, configured to: before the first receiving unit A21 receives the configuration information sent by the control node, report capability information of supporting monitoring of the first control channel of the first cell to the control node.

It should be noted that for detailed descriptions of some functional modules of the UE provided in this embodiment of the present invention, reference may be made to corresponding content in other embodiments of the present invention. No further details are provided in this embodiment.

According to the UE provided in this embodiment of the present invention, when the UE adds a non-serving cell to an active set, the UE receives configuration information sent by a control node and monitors a first control channel of a first cell according to channel configuration information of the first control channel of the first cell in the configuration information. Compared with a method in which the UE adds the non-serving cell to the active set before generating uplink interference on the non-serving cell in the prior art, when a serving base station cannot receive uplink scheduling information of the UE, the UE may complete uplink transmission through scheduling of a base station of the non-serving cell or complete uplink data transmission through a change of a serving cell.

Another embodiment of the present invention further provides a device of a first cell shown in FIG. a3, including: a receiving unit A31 and a first sending unit A32.

The receiving unit A31 is configured to receive a first activation message when a first triggering condition is met, where the first activation message is used to instruct the device of the first cell to send the first control channel to a UE.

The first sending unit A32 is configured to send the first control channel to the UE after the receiving unit A31 receives the first activation message, where the first control channel includes an E-DCH Absolute Grant Channel E-AGCH.

Further, that the first triggering condition is met includes the following: the control node receives a message that an SIR of the UE is lower than a certain threshold, where the message is sent by a device of a second cell; and/or, the control node determines that a block error rate of uplink data of the second cell is higher than a certain threshold.

Further, in an application scenario of this embodiment, the device of the first cell may further include: a second sending unit A33.

The second sending unit A33 is configured to send an RG up instruction to the UE after the receiving unit A31 receives the first activation message.

It should be noted that for detailed descriptions of some functional modules of the device of the first cell provided in this embodiment of the present invention, reference may be made to corresponding content in other embodiments of the present invention. No further details are provided in this embodiment.

According to the device of the first cell provided in this embodiment of the present invention, when a first triggering condition is met, a first activation message is received and the first control channel is sent to a UE according to an instruction of the first activation message. Compared with a method in which the UE adds a non-serving cell to an active set before generating uplink interference on the non-serving cell in the prior art, when a serving base station cannot receive uplink scheduling information of the UE, the UE may complete uplink transmission through scheduling of a base station of the non-serving cell or complete uplink data transmission through a change of a serving cell.

Another embodiment of the present invention further provides a device of a second cell shown in FIG. a4, including: a processing unit A41 and a first sending unit A42.

The processing unit A41 is configured to generate a command that instructs a UE to monitor a first control channel of a first cell.

The first sending unit A42 is configured to send, to the UE through a High Speed Shared Control Channel HS-SCCH, the command that is generated by the processing unit A41 and instructs the UE to monitor the first control channel of the first cell, where the first control channel includes an E-DCH Absolute Grant Channel E-AGCH and the first cell is a non-serving cell of the UE.

Further, the device of the second cell may further include: a receiving unit A43.

The receiving unit 43 is configured to: before the processing unit A41 generates the command that instructs the UE to monitor the first control channel of the first cell, receive a triggering instruction sent by the control node.

The first sending unit A42 is further configured to: after the receiving unit A43 receives the triggering instruction, sends, to the UE through the High Speed Shared Control Channel HS-SCCH, the command that instructs the UE to monitor the first control channel of the first cell.

Further, the device of the second cell may further include: a detecting unit A44 and a second sending unit A45.

The detecting unit A44 is configured to detect an SIR of the UE before the receiving unit A43 receives the triggering instruction sent by the control node.

The second sending unit A45 is configured to: when the SIR of the UE is lower than a certain threshold, send a message that the SIR of the UE is lower than the certain threshold to the control node, so that the control node sends the triggering instruction.

It should be noted that for detailed descriptions of some functional modules of the device of the second cell provided in this embodiment of the present invention, reference may be made to corresponding content in other embodiments of the present invention. No further details are provided in this embodiment.

According to the second cell provided in this embodiment of the present invention, a command that instructs a UE to monitor a first control channel of a first cell is sent to the UE through a High Speed Shared Control Channel HS-SCCH. Compared with a method in which the UE adds a non-serving cell to an active set before generating uplink interference on the non-serving cell in the prior art, when a serving base station cannot receive uplink scheduling information of the UE, the UE may complete uplink transmission through scheduling of a base station of the non-serving cell or complete uplink data transmission through a change of a serving cell.

Another embodiment of the present invention further provides a control node shown in FIG. a5, including: a triggering unit A51 and a first sending unit A52.

The triggering unit A51 is configured to detect whether a first triggering condition is met.

The first sending unit A52 is configured to send a first activation message to a device of a first cell when the first triggering condition is met, so that the device of the first cell sends an RG up instruction to the UE, where the first cell is a non-serving cell of the UE.

Further, the control node may further include: a second sending unit A53.

The second sending unit A53 is configured to send a triggering instruction to a device of a second cell, so that the device of the second cell sends, to the UE through a High Speed Shared Control Channel HS-SCCH, a command that instructs the UE to monitor the RG up instruction of the first cell, where the second cell is a serving cell of the UE.

In an application scenario of this embodiment, the second sending unit A53 may further be configured to send a first RRC message to the UE, where the first RRC message is used to instruct the UE to monitor the RG up instruction of the first cell.

Further, that the first triggering condition is met includes the following:

the control node receives a message that a signal to interference ratio SIR of the UE is lower than a certain threshold, where the message is sent by the device of the second cell; and/or, the control node determines that a block error rate of uplink data of the second cell is higher than a certain threshold.

It should be noted that for detailed descriptions of some functional modules of the control node provided in this embodiment of the present invention, reference may be made to corresponding content in other embodiments of the present invention. No further details are provided in this embodiment.

According to the control node provided in this embodiment of the present invention, when a first triggering condition is met, a first activation message is sent to a device of a first cell, so that the device of the first cell sends an RG up instruction to the UE. Compared with a method in which the UE adds a non-serving cell to an active set before generating uplink interference on the non-serving cell in the prior art, when a serving base station cannot receive uplink scheduling information of the UE, the UE may receive the RG up instruction sent by the base station of the non-serving cell and perform uplink scheduling so as to complete uplink transmission.

Another embodiment of the present invention further provides a user equipment UE shown in FIG. a6, including: a first receiving unit A61 and a second receiving unit A62.

The first receiving unit A61 receives a High Speed Shared Control Channel HS-SCCH command sent by a device of a second cell, where the HS-SCCH command is used to instruct the UE to monitor an RG up instruction of a first cell; or receives a first Radio Resource Control Protocol RRC message sent by a control node, where the first RRC message includes an RG up instruction that instructs the UE to monitor a first cell.

The second receiving unit A62 is configured to: after the first receiving unit A61 receives an instruction, receive the RG up instruction sent by a device of the first cell, where the first cell is a non-serving cell of the UE.

It should be noted that for detailed descriptions of some functional modules of the UE provided in this embodiment of the present invention, reference may be made to corresponding content in other embodiments of the present invention. No further details are provided in this embodiment.

According to the UE provided in this embodiment of the present invention, uplink scheduling may be performed by receiving an RG up instruction sent by a device of a first cell.

Compared with a method in which the UE adds a non-serving cell to an active set before generating uplink interference on the non-serving cell in the prior art, when a serving base station cannot receive uplink scheduling information of the UE, the UE may receive the RG up instruction sent by the base station of the non-serving cell and perform uplink scheduling so as to complete uplink transmission.

Another embodiment of the present invention further provides a device of a first cell shown in FIG. a7, including: a receiving unit A71 and a sending unit A72.

The receiving unit A71 is configured to receive a first activation message.

The sending unit A72 is configured to send an RG up instruction to the UE after the receiving unit A71 receives the first activation message, where the first cell is a non-serving cell of the UE.

It should be noted that for detailed descriptions of some functional modules of the device of the first cell provided in this embodiment of the present invention, reference may be made to corresponding content in other embodiments of the present invention. No further details are provided in this embodiment.

According to the device of the first cell provided in this embodiment of the present invention, after a first activation message sent by the control node is received, an RG up instruction is sent to the UE to perform uplink scheduling. Compared with a method in which the UE adds a non-serving cell to an active set before generating uplink interference on the non-serving cell in the prior art, when a serving base station cannot receive uplink scheduling information of the UE, the UE may receive the RG up instruction sent by the base station of the non-serving cell and perform uplink scheduling so as to complete uplink transmission.

Another embodiment of the present invention further provides a device of a second cell shown in FIG. a8, including: a detecting unit A81 and a sending unit A82.

The detecting unit A81 is configured to detect an SIR of a UE.

The sending unit A82 is configured to detect the SIR of the UE; when the SIR of the UE is lower than a certain threshold, send, to the UE through a High Speed Shared Control Channel HS-SCCH, a command that instructs the UE to monitor an RG up instruction of a first cell; or, after receiving a triggering instruction sent by a control node, send, to the UE through a High Speed Shared Control Channel HS-SCCH, a command that instructs the UE to monitor an RG up instruction of a first cell.

It should be noted that for detailed descriptions of some functional modules of the second device provided in this embodiment of the present invention, reference may be made to corresponding content in other embodiments of the present invention. No further details are provided in this embodiment.

According to the device of the second cell provided in this embodiment of the present invention, an SIR of a UE may be detected, and when the SIR of the UE is lower than a certain threshold, a command that instructs the UE to monitor an RG up instruction of a first cell is sent to the UE through a High Speed Shared Control Channel HS-SCCH. Compared with a method in which the UE adds a non-serving cell to an active set before generating uplink interference on the non-serving cell in the prior art, when a serving base station cannot receive uplink scheduling information of the UE, the UE may receive the RG up instruction sent by the base station of the non-serving cell and perform uplink scheduling so as to complete uplink transmission.

Another embodiment of the present invention further provides a control node shown in FIG. b1, including: a memory B11 and a transmitter B12.

The memory B11 is configured to store configuration information.

The transmitter B12 is configured to send the configuration information stored in the memory B11 to a user equipment UE, so that the UE monitors a first control channel of a first cell according to the configuration information, where the configuration information includes channel configuration information of the first control channel of the first cell, the first control channel includes an E-DCH Absolute Grant Channel E-AGCH, and the first cell is a non-serving cell of the UE.

Further, the transmitter B12 is further configured to send a first activation message to a device of the first cell when a first triggering condition is met, where the first activation message is used to instruct the device of the first cell to send the first control channel to the UE.

Further, in an application scenario of this embodiment, the transmitter B12 is further configured to send a triggering instruction to a device of a second cell after sending the configuration information to the UE and when the first triggering condition is met, so that the device of the second cell sends, to the UE through a High Speed Shared Control Channel HS-SCCH, a command that instructs the UE to monitor the first control channel of the first cell, where the second cell is a serving cell of the UE.

Further, the control node may further include: a processor B13.

The processor B13 is configured to detect whether the first triggering condition is met.

That the first triggering condition is met includes the following: the control node receives a message that a signal to interference ratio SIR of the UE is lower than a certain threshold, where the message is sent by the device of the second cell; and/or, the control node determines that a block error rate of uplink data of the second cell is higher than a certain threshold.

Further, in another application scenario of this embodiment, the transmitter B12 is further configured to send the channel configuration information of the first cell to the UE, so that the UE simultaneously monitors the E-AGCH of the second cell and the first control channel of the first cell.

Further, in another application scenario of this embodiment, the transmitter B12 is further configured to send a first RRC message to the UE, where the first RRC message is used to instruct the UE to monitor the first control channel of the first cell.

Further, the receiver B12 is further configured to: before the transmitter B12 sends the configuration information to the UE, receive capability information reported by the UE, where the capability information is used to determine a capability of the UE to support monitoring of the first control channel of the first cell.

It should be noted that for detailed descriptions of some functional modules of the control node provided in this embodiment of the present invention, reference may be made to corresponding content in other embodiments of the present invention. No further details are provided in this embodiment.

According to the control node provided in this embodiment of the present invention, when a UE adds a non-serving cell to an active set, the control node sends configuration information to the UE, so that the UE monitors a first control channel of the first cell according to the configuration information; in addition, a first activation message is sent to a device of the first cell, so as to instruct the device of the first cell to send the first control channel to the UE. Compared with a method in which the UE adds the non-serving cell to the active set before generating uplink interference on the non-serving cell in the prior art, when a serving base station cannot receive uplink scheduling information of the UE, the UE may complete uplink transmission through scheduling of a base station of the non-serving cell or complete uplink data transmission through a change of a serving cell.

Another embodiment of the present invention further provides a user equipment UE shown in FIG. b2, including: a receiver B21 and a processor B22.

The receiver B21 is configured to receive configuration information sent by a control node, where the configuration information includes channel configuration information of a first control channel of a first cell.

The processor B22 is configured to monitor the first control channel of the first cell according to the configuration information received by the receiver B21, where the first control channel includes an E-DCH Absolute Grant Channel E-AGCH and the first cell is a non-serving cell of the UE.

Further alternatively, in an application scenario of this embodiment, the receiver B21 is further configured to receive an instruction through a High Speed Shared Control Channel HS-SCCH.

The processor B22 is further configured to monitor a command of the first control channel of the first cell according to the instruction received by the receiver B21 and the configuration information.

Further alternatively, in another application scenario of this embodiment, the receiver B21 is further configured to receive a first RRC message sent by the control node.

The processor B22 is further configured to monitor the first control channel of the first cell according to an instruction of the first RRC message received by the receiver B21.

Further, the receiver is further configured to receive an RG up instruction sent by a device of the first cell.

Further alternatively, in another application scenario of this embodiment, the processor B22 is further configured to switch an uplink serving cell to the first cell.

Further alternatively, in another application scenario of this embodiment, the processor B22 is further configured to simultaneously monitor an E-AGCH of a second cell and the first control channel of the first cell, where the second cell is a serving cell of the UE.

Further, the UE may further include a transmitter B23.

The transmitter B23 is configured to: before the receiver B21 receives the configuration information sent by the control node, report capability information of supporting monitoring of the first control channel of the first cell to the control node.

It should be noted that for detailed descriptions of some functional modules of the UE provided in this embodiment of the present invention, reference may be made to corresponding content in other embodiments of the present invention. No further details are provided in this embodiment.

According to the UE provided in this embodiment of the present invention, when the UE adds a non-serving cell to an active set, the UE receives configuration information sent by a control node and monitors a first control channel of a first cell according to channel configuration information of the first control channel of the first cell in the configuration information. Compared with a method in which the UE adds the non-serving cell to the active set before generating uplink interference on the non-serving cell in the prior art, when a serving base station cannot receive uplink scheduling information of the UE, the UE may complete uplink transmission through scheduling of a base station of the non-serving cell or complete uplink data transmission through a change of a serving cell.

Another embodiment of the present invention further provides a device of a first cell shown in FIG. b3, including: a receiver B31 and a transmitter B32.

The receiver B31 is configured to receive a first activation message when a first triggering condition is met, where the first activation message is used to instruct the device of the first cell to send the first control channel to a UE.

The transmitter B32 is configured to send the first control channel to the UE, where the first control channel includes an E-DCH Absolute Grant Channel E-AGCH.

Further, that the first triggering condition is met includes the following: the control node receives a message that an SIR of the UE is lower than a certain threshold, where the message is sent by a device of a second cell; and/or, the control node determines that a block error rate of uplink data of the second cell is higher than a certain threshold.

Further, the transmitter B32 is further configured to send an RG up instruction to the UE after the receiver B31 receives the first activation message.

It should be noted that for detailed descriptions of some functional modules of the device of the first cell provided in this embodiment of the present invention, reference may be made to corresponding content in other embodiments of the present invention. No further details are provided in this embodiment.

According to the device of the first cell provided in this embodiment of the present invention, when a first triggering condition is met, a first activation message is received and the first control channel is sent to a UE according to an instruction of the first activation message. Compared with a method in which the UE adds a non-serving cell to an active set before generating uplink interference on the non-serving cell in the prior art, when a serving base station cannot receive uplink scheduling information of the UE, the UE may complete uplink transmission through scheduling of a base station of the non-serving cell or complete uplink data transmission through a change of a serving cell.

Another embodiment of the present invention further provides a device of a second cell shown in FIG. b4, including: a processor B41 and a transmitter B42.

The processor B41 is configured to generate a command that instructs a UE to monitor a first control channel of a first cell.

The transmitter B42 is configured to send, to the UE through a High Speed Shared Control Channel HS-SCCH, the command that is generated by the processor B41 and instructs the UE to monitor the first control channel of the first cell, where the first control channel includes an E-DCH Absolute Grant Channel E-AGCH and the first cell is a non-serving cell of the UE.

Further, the device of the second cell may further include: a receiver B43.

The receiver B43 is configured to: before the transmitter B42 sends, to the UE through the High Speed Shared Control Channel HS-SCCH, the command that instructs the UE to monitor the first control channel of the first cell, receive a triggering instruction sent by a control node.

Further, the transmitter B42 is further configured to: after the receiver B43 receives the triggering instruction, sends, to the UE through the High Speed Shared Control Channel HS-SCCH, the command that instructs the UE to monitor the first control channel of the first cell.

Further, the processor B41 is further configured to detect an SIR of the UE before the receiver B43 receives the triggering instruction sent by the control node.

Further, the transmitter B42 is further configured to: when the SIR of the UE is lower than a certain threshold, send a message that the SIR of the UE is lower than the certain threshold to the control node, so that the control node sends the triggering instruction.

It should be noted that for detailed descriptions of some functional modules of the device of the second cell provided in this embodiment of the present invention, reference may be made to corresponding content in other embodiments of the present invention. No further details are provided in this embodiment.

According to the device of the second cell provided in this embodiment of the present invention, a command that instructs a UE to monitor a first control channel of a first cell is sent to the UE through a High Speed Shared Control Channel HS-SCCH. Compared with a method in which the UE adds a non-serving cell to an active set before generating uplink interference on the non-serving cell in the prior art, when a serving base station cannot receive uplink scheduling information of the UE, the UE may complete uplink transmission through scheduling of a base station of the non-serving cell or complete uplink data transmission through a change of a serving cell.

Another embodiment of the present invention further provides a control node shown in FIG. b5, including: a processor B51 and a transmitter B52.

The processor B51 is configured to detect whether a first triggering condition is met.

The transmitter B52 is configured to send a first activation message to a device of a first cell when the first triggering condition is met, so that the device of the first cell sends an RG up instruction to the UE, where the first cell is a non-serving cell of the UE.

Further alternatively, in an application scenario of this embodiment, the transmitter B52 is further configured to send a triggering instruction to a device of a second cell, so that the device of the second cell sends, to the UE through a High Speed Shared Control Channel HS-SCCH, a command that instructs the UE to monitor the RG up instruction of the first cell, where the second cell is a serving cell of the UE.

Further alternatively, in another application scenario of this embodiment, the transmitter B52 is further configured to send a first RRC message to the UE, where the first RRC message is used to instruct the UE to monitor the RG up instruction of the first cell.

Further, that the first triggering condition is met includes the following:

the control node receives a message that a signal to interference ratio SIR of the UE is lower than a certain threshold, where the message is sent by the device of the second cell; and/or, the control node determines that a block error rate of uplink data of the second cell is higher than a certain threshold.

It should be noted that for detailed descriptions of some functional modules of the control node provided in this embodiment of the present invention, reference may be made to corresponding content in other embodiments of the present invention. No further details are provided in this embodiment.

According to the control node provided in this embodiment of the present invention, when a first triggering condition is met, a first activation message is sent to a device of a first cell, so that the device of the first cell sends an RG up instruction to the UE. Compared with a method in which the UE adds a non-serving cell to an active set before generating uplink interference on the non-serving cell in the prior art, when a serving base station cannot receive uplink scheduling information of the UE, the UE may receive the RG up instruction sent by the base station of the non-serving cell and perform uplink scheduling so as to complete uplink transmission.

Another embodiment of the present invention further provides a user equipment UE shown in FIG. b6, including:

a receiver B61, configured to receive a High Speed Shared Control Channel HS-SCCH command sent by a device of a second cell, where the HS-SCCH command is used to instruct the UE to monitor an RG up instruction of a first cell.

Further alternatively, in another application scenario of this embodiment, the receiver B61 is further configured to receive a first Radio Resource Control Protocol RRC message sent by a control node, where the first RRC message includes the RG up instruction that instructs the UE to monitor the first cell.

Further, the UE may further include a processor B62.

The processor B62 is configured to monitor the RG up instruction of the first cell.

The receiver B61 is further configured to receive the RG up instruction sent by a device of the first cell, where the first cell is a non-serving cell of the UE.

It should be noted that for detailed descriptions of some functional modules of the UE provided in this embodiment of the present invention, reference may be made to corresponding content in other embodiments of the present invention. No further details are provided in this embodiment.

According to the UE provided in this embodiment of the present invention, uplink scheduling may be performed by receiving an RG up instruction sent by a device of a first cell. Compared with a method in which the UE adds a non-serving cell to an active set before generating uplink interference on the non-serving cell in the prior art, when a serving base station cannot receive uplink scheduling information of the UE, the UE may receive the RG up instruction sent by the base station of the non-serving cell and perform uplink scheduling so as to complete uplink transmission.

Another embodiment of the present invention further provides a device of a first cell shown in FIG. b7, including: a receiver B71 and a transmitter B72.

The receiver B71 is configured to receive a first activation message.

The transmitter B72 is configured to send an RG up instruction to the UE after the receiver B71 receives the first activation message, where the first cell is a non-serving cell of the UE.

It should be noted that for detailed descriptions of some functional modules of the device of the first cell provided in this embodiment of the present invention, reference may be made to corresponding content in other embodiments of the present invention. No further details are provided in this embodiment.

According to the device of the first cell provided in this embodiment of the present invention, after a first activation message sent by the control node is received, an RG up instruction is sent to the UE to perform uplink scheduling. Compared with a method in which the UE adds a non-serving cell to an active set before generating uplink interference on the non-serving cell in the prior art, when a serving base station cannot receive uplink scheduling information of the UE, the UE may receive the RG up instruction sent by the base station of the non-serving cell and perform uplink scheduling so as to complete uplink transmission.

Another embodiment of the present invention further provides a device of a second cell shown in FIG. b8, including: a processor B81 and a transmitter B82.

The processor B81 is configured to detect an SIR of a UE.

In an application scenario of this embodiment, the transmitter B82 is configured to: when the SIR of the UE is lower than a certain threshold, send, to the UE through a High Speed Shared Control Channel HS-SCCH, a command that instructs the UE to monitor an RG up instruction of a first cell.

Further alternatively, in another application scenario of this embodiment, the transmitter B82 is further configured to: after receiving a triggering instruction sent by a control node, send, to the UE through the High Speed Shared Control Channel HS-SCCH, the command that instructs the UE to monitor the RG up instruction of the first cell.

It should be noted that for detailed descriptions of some functional modules of the device of the second cell provided in this embodiment of the present invention, reference may be made to corresponding content in other embodiments of the present invention. No further details are provided in this embodiment.

According to the device of the second cell provided in this embodiment of the present invention, an SIR of a UE may be detected, and when the SIR of the UE is lower than a certain threshold, a command that instructs the UE to monitor an RG up instruction of a first cell is sent to the UE through a High Speed Shared Control Channel HS-SCCH. Compared with a method in which the UE adds a non-serving cell to an active set before generating uplink interference on the non-serving cell in the prior art, when a serving base station cannot receive uplink scheduling information of the UE, the UE may receive the RG up instruction sent by the base station of the non-serving cell and perform uplink scheduling so as to complete uplink transmission.

It can be clearly understood by persons skilled in the art that, for the purpose of convenient and brief description, division of the foregoing function modules is merely used as an example for description, in actual application, the foregoing functions can be allocated to different modules and implemented according to the need, that is, the internal structure of the apparatus is divided into different function modules to implement all or a part of the functions described above. For a detailed working process of the foregoing system, apparatus and unit, reference may be made to the corresponding process in the method embodiments, and the details will not be described herein again.

In the several embodiments provided in the present invention, it should be understood that the disclosed system, apparatus, and method may be implemented in other manners. For example, the described apparatus embodiments are merely exemplary. For example, the division of the modules or units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium, and includes several instructions for instructing a computer device (which may be a personal computer, a server, or a network device or the like) or a processor (processor) to perform all or a part of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

Through the foregoing description of the embodiments, it is clear to persons skilled in the art that the present invention may be implemented by software plus necessary universal hardware, and definitely may also be implemented by hardware, but in many cases, the former implementation is preferred. Based on such an understanding, the technical solutions of the present invention essentially, or the part contributing to the prior art may be implemented in a form of a software product. The computer software product is stored in a readable storage medium, for example, a floppy disk, a hard disk, or an optical disc of the computer, and includes several instructions for instructing a computer device (which may be a personal computer, a server, or a network device or the like) to perform the methods described in the embodiments of the present invention.

The foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some technical features thereof, as long as such modifications or replacements do not cause the essence of corresponding technical solutions to depart from the spirit and scope of the technical solutions of the embodiments of the present invention.

What is claimed is:

1. An uplink scheduling method of a heterogeneous network (Hetnet), comprising:
   sending, by a control node of the Hetnet, configuration information to a user equipment (UE), so that the UE monitors a control channel of a cell of the Hetnet according to the configuration information, wherein
   the configuration information comprises channel configuration information of the control channel of the cell which is a non-serving cell of the UE, and the control channel comprises an E-DCH Absolute Grant Channel (E-AGCH) of the non-serving cell; and detecting, by the control node, whether a triggering condition is met, the triggering condition being
receipt of a message from a base station of a serving cell indicating that a signal to interference ratio of the UE monitored by the base station of the serving cell is lower than a threshold, and/or
a block error rate of uplink data of the serving cell being higher than a threshold; and in response to detecting that the triggering condition is met, sending, by the control node, an activation message to a base station of the non-serving cell instructing the base station of the non-serving cell to send the control channel to the UE, so that the UE, upon receiving the control channel when monitoring the control channel, completes uplink transmission through a scheduling of the base station of the non-serving cell according to the control channel.

2. The method according to claim 1, wherein the sending, by a control node, configuration information to a UE further comprises:
sending, by the control node, a Radio Resource Control Protocol (RRC) message to the UE, wherein the RRC message is used to instruct the UE to monitor the control channel of the cell.

3. The method according to claim 1, before the sending, by a control node, configuration information to a UE, further comprising:
receiving, by the control node, capability information reported by the UE, wherein the capability information is used to determine a capability of the UE to support monitoring of the control channel of the cell.

4. The method according to claim 1, performed when the UE is in a soft handover area, of the heterogeneous network (Hetnet), in which the UE is simultaneously connectable to both the serving cell and the non-serving cell.

5. An uplink scheduling method of a heterogeneous network (Hetnet), comprising:
receiving, by a user equipment (UE) in communication with the Hetnet, configuration information sent by a control node of the Hetnet, wherein the configuration information comprises channel configuration information of a control channel of a cell of the Hetnet which is a non-serving cell of the UE;
monitoring, by the UE, the control channel of the cell according to the configuration information, wherein the control channel comprises an E-DCH Absolute Grant Channel (E-AGCH) of the non-serving cell;
when the UE is monitoring the control channel, receiving, by the UE, the control channel from a base station of the non-serving cell, the control channel sent by the base station of the non-serving cell in response to a triggering condition being met, the triggering condition being
the control node receiving a message from a base station of a serving cell indicating that a signal to interference ratio of the UE monitored by the base station of the serving cell is lower than a threshold, and/or
the control node detecting a block error rate of uplink data of the serving cell to be higher than a threshold; and
completing uplink transmission by the UE through a scheduling of the base station of the non-serving cell according to the control channel.

6. The method according to claim 5, further comprising:
receiving, by the UE through a High Speed Shared Control Channel (HS-SCCH), a command that instructs the UE to monitor the control channel of the cell according to the configuration information; or
receiving, by the UE, a Radio Resource Control Protocol (RRC) message sent by the control node, wherein the RRC message is used to instruct the UE to monitor the control channel of the cell.

7. The method according to claim 5, wherein the monitoring, by the UE, the control channel of the cell according to the configuration information further comprises:
switching, by the UE, an uplink serving cell to the cell.

8. The method according to claim 5, before the receiving, by a UE, configuration information sent by a control node, further comprising:
reporting, by the UE, capability information of supporting monitoring of the control channel of the cell to the control node.

9. An uplink scheduling method of a heterogeneous network (Hetnet), comprising:
receiving, by a device of a cell of the Hetnet, an activation message when a triggering condition is met, the activation message instructing the device of the cell to send a control channel to a user equipment (UE), the control channel comprising an E-DCH Absolute Grant Channel (E-AGCH) of the cell, the activation message sent by the control node to device of the cell in response to a triggering condition being met, the triggering condition being
the control node receiving a message from a base station of a serving cell indicating that a signal to interference ratio of the UE monitored by the base station of the serving cell is lower than a threshold, and/or
the control node detecting a block error rate of uplink data of the serving cell to be higher than a threshold; and
sending, by the device of the cell, the control channel to the UE so that the UE completes uplink transmission through a scheduling of the base station of the cell according to the control channel.

10. A control node of a heterogeneous network (Hetnet), comprising:
a memory, configured to store configuration information;
a transmitter; and
a processor coupled to the memory, the processor configured to
send, using the transmitter, the configuration information to a user equipment (UE), so that the UE monitors a control channel of a cell of the Hetnet according to the configuration information, wherein the configuration information comprises channel configuration information of the control channel of the cell which is a non-serving cell of the UE, and
the control channel comprises an E-DCH Absolute Grant Channel (E-AGCH) of the non-serving cell, and
detecting, by the control node, whether a triggering condition is met, the triggering condition being
receipt of a message from a base station of a serving cell indicating that a signal to interference ratio of the UE monitored by the base station of the serving cell is lower than a threshold, and/or
a block error rate of uplink data of the serving cell being higher than a threshold, and upon detecting that the triggering condition is met, send, using the transmitter, an activation message to a base station of the non-serving cell instructing the base station of the non-serving cell to send the control channel to the UE, so that so that the UE, upon receiving the control channel when monitoring the control channel, completes uplink transmission through a scheduling of the base station of the non-serving cell according to the control channel.

11. The control node according to claim 10, wherein the cell comprises a first cell and wherein the transmitter is further configured to send a triggering instruction to a device of a second cell when a triggering condition is met, so that the device of the second cell sends, to the UE through a High Speed Shared Control Channel (HS-SCCH), a command that instructs the UE to monitor the control channel of the first cell, wherein the second cell is a serving cell of the UE.

12. The control node according to claim 10, wherein the transmitter is further configured to send a Radio Resource Control Protocol (RRC) message to the UE, wherein the RRC message is used to instruct the UE to monitor the control channel of the cell.

13. The control node according to claim 10, further comprising:
a receiver, configured to: before the transmitter sends the configuration information to the UE, receive capability information reported by the UE, wherein the capability information is used to determine a capability of the UE to support monitoring of the control channel of the cell.

14. A user equipment (UE) in communication with a heterogeneous network (Hetnet), comprising:
a receiver, configured to receive configuration information sent by a control node of the Hetnet, wherein the configuration information comprises channel configuration information of a control channel of a cell of the Hetnet which is a non-serving cell of the UE; and
a processor, configured to
monitor the control channel of the cell according to the configuration information received by the receiver, wherein the control channel comprises an E-DCH Absolute Grant Channel (E-AGCH),
when the processor is monitoring the control channel, receive, using the receiver, the control channel from a base station of the non-serving cell, the control channel sent by the base station of the non-serving cell in response to a triggering condition being met, the triggering condition being
the control node receiving a message from a base station of a serving cell indicating that a signal to interference ratio of the UE monitored by the base station of the serving cell is lower than a threshold, and/or
the control node detecting a block error rate of uplink data of the serving cell to be higher than a threshold, and
complete uplink transmission through a scheduling of a base station of the non-serving cell according to the control channel.

15. The UE according to claim 14, wherein the receiver is further configured to receive an instruction through a High Speed Shared Control Channel (HS-SCCH), and
the processor is further configured to monitor a command of the control channel of the cell according to the instruction received by the receiver and the configuration information; or
the receiver is further configured to receive a Radio Resource Control Protocol (RRC) message sent by the control node, and
the processor is further configured to monitor the control channel of the cell according to an instruction of the RRC message received by the receiver.

16. The UE according to claim 14, wherein the cell comprises a first cell and wherein the processor is further configured to simultaneously monitor an E-AGCH of a second cell and the control channel of the first cell, wherein the second cell is a serving cell of the UE.

17. The UE according to claim 14, further comprising:
a transmitter, configured to: before the receiver receives the configuration information sent by the control node, report capability information of supporting monitoring of the control channel of the cell to the control node.

* * * * *